(12) United States Patent
Nakabayashi et al.

(10) Patent No.: US 6,379,017 B2
(45) Date of Patent: Apr. 30, 2002

(54) ILLUMINATING SYSTEM

(75) Inventors: Koki Nakabayashi, Neyagawa; Kanji Nishii; Atsushi Fukui, both of Osaka; Hiroshi Watanabe, Yawata; Ken Tatsuta, Kadoma, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/769,497

(22) Filed: Jan. 26, 2001

Related U.S. Application Data

(62) Division of application No. 09/076,123, filed on May 12, 1998, now abandoned.

(30) Foreign Application Priority Data

| May 13, 1997 | (JP) | ............................................. 9-122343 |
| Aug. 21, 1997 | (JP) | ............................................. 9-224992 |
| Feb. 26, 1998 | (JP) | ............................................. 10-44960 |

(51) Int. Cl.[7] .......................... F21V 7/04; G01D 11/28; G02F 1/1335
(52) U.S. Cl. .............................. 362/31; 362/26; 349/63
(58) Field of Search .............................. 362/31, 27, 26, 362/297; 385/146, 901; 349/62, 63, 61, 113, 64; 359/599

(56) References Cited

U.S. PATENT DOCUMENTS

| 4,373,282 A | 2/1983 | Wragg ........................... 362/31 |
| 4,576,436 A | 3/1986 | Daniel ........................... 385/25 |
| 5,359,691 A | 10/1994 | Tai et al. ....................... 385/146 |
| 5,461,547 A | * 10/1995 | Ciupke et al. ................. 362/31 |
| 5,485,354 A | * 1/1996 | Ciupke et al. ................. 362/31 |
| 5,499,165 A | 3/1996 | Holmes, Jr. .................... 362/31 |
| 5,506,929 A | 4/1996 | Tai et al. ....................... 385/146 |

FOREIGN PATENT DOCUMENTS

| DE | 195 21 254 | 1/1996 |
| EP | 0 534 140 | 3/1993 |
| GB | 2 281 802 | 3/1995 |
| JP | 5-158034 | 6/1993 |
| JP | 7-199184 | 8/1995 |
| WO | 95/34009 | 12/1995 |
| WO | 97/08582 | 3/1997 |

OTHER PUBLICATIONS

C. Y. Tai, et al. "A Transparent Frontlighting System for Reflective–Type Displays", SID 95 Digest, May 23, 1995, pp. 375–378.
C. Y. Tai, et al. "Compact Front Lighting for Reflective Displays" SID 96 Applications Digest, 1996, pp. 43–46.

* cited by examiner

*Primary Examiner*—Cassandra Spyrou
*Assistant Examiner*—Jennifer Winstedt
(74) *Attorney, Agent, or Firm*—Wenderoth, Lind & Ponack, L.L.P.

(57) ABSTRACT

The illuminating system comprises a linear light source, and a light guide member with the light source placed beside a side face thereof, in which the top face and the bottom face of the light guide member are generally parallel to each other and in which slits made of a different material or air are arranged at specified intervals in the top face of the light guide member. Therefore, most of light propagating within the light guide member is totally reflected at the slits formed in the light guide member so as to be outputted from the light guide member, thereby illuminating a reflecting plate. Its reflected light is incident again on the light guide member and the resulting totally reflected light is transmitted to the observer's side at places other than the slits, while the observer's field of view is not obstructed at the slit portions.

7 Claims, 25 Drawing Sheets

Fig.9A
Fig.9B
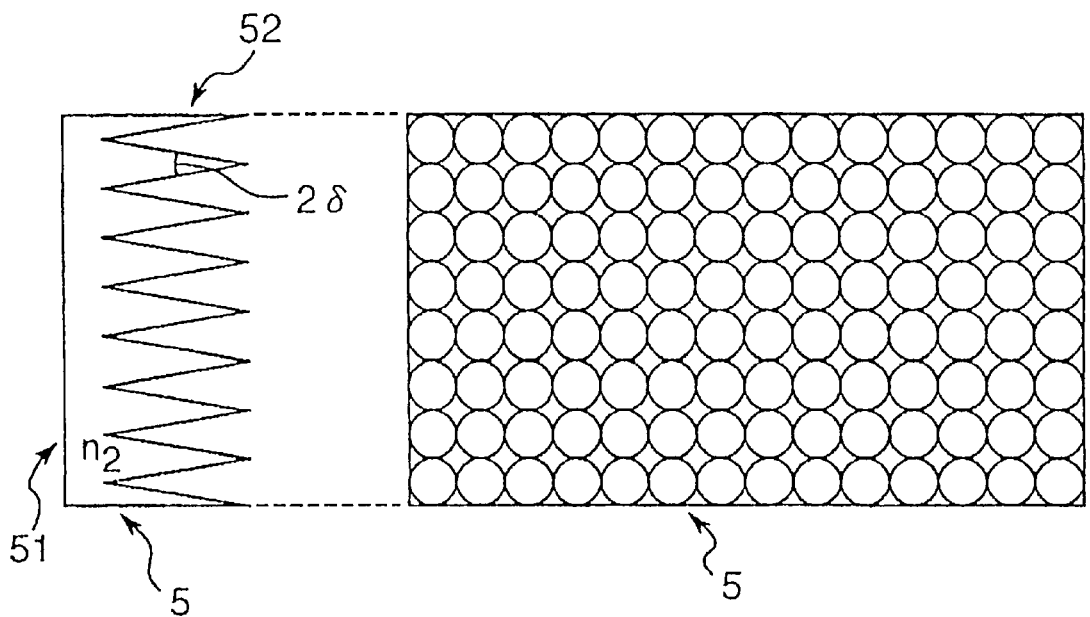
Fig.10
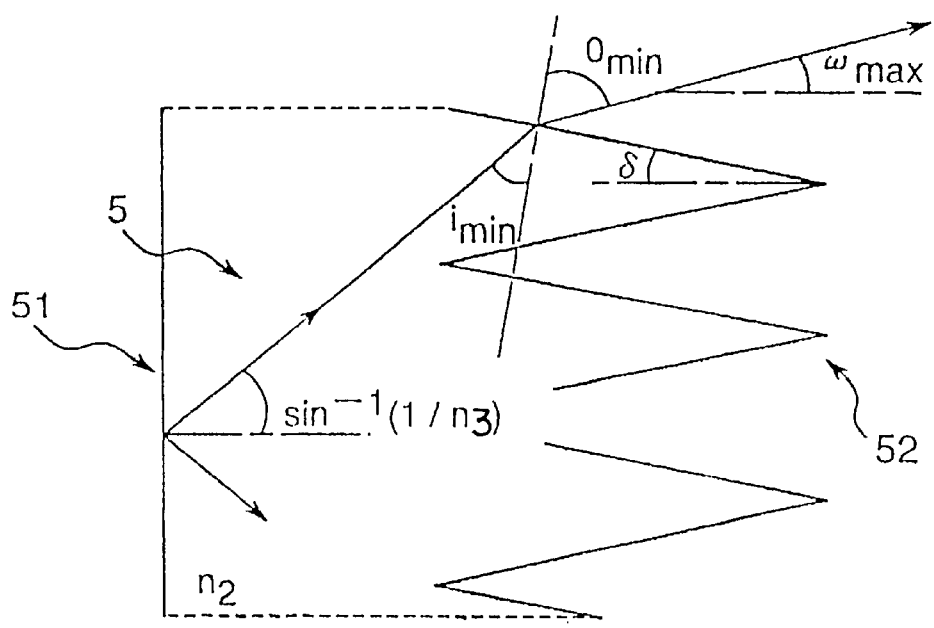

ANGLE [deg]   $\theta_1 = 40°, \theta_2 = 10°$

US 6,379,017 B2

ILLUMINATING SYSTEM

This is a divisional application of Ser. No. 09/076,123 filed May 12, 1998 abandoned.

BACKGROUND OF THE INVENTION

The present invention relates to an illuminating system to be used for printed articles such as books and photographs, screen displays of personal computers or other office automation equipment, portable information terminals, portable video tape recorders and the like, or reflection type liquid crystal displays used in various monitors, and the like.

In recent years, personal computers, portable information terminals, video tape recorders and the like have been becoming increasingly small-sized and portable, making it an important issue to reduce the power consumption of their image display units. On this account, many of them have been provided with reflection type liquid crystal displays used as their image display units.

The reflection type liquid crystal display device is given screen brightness by reflecting outside light such as sunlight and indoor light. However, at places of less outside light, the device could not afford enough brightness in the screen. As a result of this, there have been invented several reflection type liquid crystal displays equipped with an illuminating system which enables screen display even at places of insufficient outside light.

An example of the illuminating system to be mounted on the reflection type liquid crystal display device is shown. FIG. 16 is a schematic cross-sectional view of a conventional illuminating system. As shown in FIG. 16, the conventional illuminating system comprises a light source 1, a reflector 2, a light guide member 63 and a compensating plate 5. In order that the reflector 2 collimates the light emitted from the light source 1, the distance from the light source 1 to a side face of the light guide member 63 is elongated. The light guide member 63 has a function of propagating the light introduced from the reflector 2 by totally reflecting the light, and a function of illuminating a reflecting plate 4 by totally reflecting the light with slopes of grooves formed in its top face to change the angle of the light. The compensating plate 5 has a function of correcting any distortion that occurs when the reflected light from the reflecting plate 4 passes the light guide member 63.

However, in the conventional illuminating system, when the light that has been transmitted by the light guide member 63 to the compensating plate 5 comes incident on the light guide member 63 again after being totally reflected by the top face of the compensating plate 5, part of the light is reflected by the slopes of the grooves of the top face of the light guide member 63 so that groove lines are more visible, as an issue. Also, whereas light is collimated by a reflector to reduce the issue of these groove lines' visibility, the collimated light is more likely to reach one side of the light guide member 63 opposite to the light source without impinging on the slopes of the grooves of the light guide member 63. This would result in a low illuminating efficiency, as another issue.

SUMMARY OF THE INVENTION

Therefore, an object of the present invention is to provide an illuminating system which makes groove lines less visible, maintains an image of reflected light successful and offers a good illuminating efficiency.

In accomplishing these and other aspects, according to a first aspect of the present invention, there is provided an illuminating system comprising:

a light source; and a transparent plate with the light source placed beside a side face thereof, wherein a plurality of grooves filled with a layer having a refractive index different from a refractive index of the transparent plate are arranged at specified intervals in a surface or interior of the transparent plate.

According to a second aspect of the present invention, there is provided an illuminating system according to the first aspect, wherein a top face and a bottom face of the transparent plate are generally parallel to each other.

According to a third aspect of the present invention, there is provided an illuminating system according to the first or second aspect, wherein a condition of $$\theta < \sin^{-1}(n_1/n) - \sin^{-1}\{(1/n)\sin(\beta)\}$$

is satisfied where n is the refractive index of the transparent plate, $n_1$ is the refractive index of a material as the layer that fills the grooves which are the slits, $\theta$ is an angle formed by each of the slits and the top face of the transparent plate and $\beta$ is an angle of visibility of the illuminating system.

According to a fourth aspect of the present invention, there is provided an illuminating system comprising:

a light source;

a transparent first plate with the light source placed beside a side face thereof; and a transparent second plate placed on a top face of the first plate, wherein a bottom face of the first plate is a plane surface and a plurality of stepwise slopes are arranged at specified intervals in the top face of the first plate;

in a bottom face of the second plate, stepwise slopes are arranged so as to be identical in configuration to the slopes of the top face of the first plate; and the top face of the first plate and the bottom face of the second plate are placed with a specified spacing.

According to a fifth aspect of the present invention, there is provided an illuminating system according to the fourth aspect, wherein a condition of $$\theta < \sin^{-1}(n_2/n) - \sin^{-1}\{(1/n)\sin(\beta)\}$$

is satisfied where n is the refractive index of the first plate, $n_2$ is the refractive index of a material as the layer bonding the first plate and the second plate to each other, $\theta$ is an angle of each of the slopes of the top face of the first plate and the bottom face of the second plate and $\beta$ is an angle of visibility of the illuminating system.

According to a sixth aspect of the present invention, there is provided an illuminating system according to the fifth aspect, wherein a light outgoing angle of a collimator placed at an outgoing exit of the light source is within $\pm \sin^{-1}[n \times \sin\{90 - \theta - \sin^{-1}(n_2/n)\}]$.

According to a seventh aspect of the present invention, there is provided an illuminating system by overhead irradiation comprising:

a light source;

a transparent plate which is a light guide member in which a plurality of grooves are arranged in a top face of the light guide member at specified intervals in a direction parallel to a longitudinal direction of the light source, and in which a flat portion constituting a part of the top face is arranged between adjacent ones of the grooves, wherein an illumination object placed on a bottom face side of the light guide member is observed from a top face side of the light guide member.

According to an eighth aspect of the present invention, there is provided an illuminating system by overhead irradiation according to the seventh aspect, wherein each of the grooves of the light guide member is a V-shaped groove having a first slope located on one side closer to the light source and a second slope located on the other side farther from the light source, and wherein an angle $\theta_1$ formed by the first slope and the bottom face of the light guide member falls within a range of $\theta_1 \leq 90°-\theta_c+2\theta_3$, where $\theta_c$ is a total reflection angle of the light guide member and $\theta_3$ is an angle formed by the flat portion and the bottom face of the light guide member.

According to a ninth aspect of the present invention, there is provided an illuminating system by overhead irradiation according to the seventh or eighth aspect, wherein each of the grooves of the light guide member is a V-shaped groove having a first slope located on one side closer to the light source and a second slope located on the other side farther from the light source, and wherein an angle $\theta_1$ formed by the first slope and the bottom face of the light guide member satisfies a condition of:

$\theta_1 \approx 45+\theta_3-(1/2)\sin^{-1}(1/n\times\sin\beta)$, where n is a refractive index of the light guide member, $\theta_3$ is an angle formed by the flat portion and the bottom face of the light guide member and $\beta$ is an angle formed by a perpendicular of the bottom face of the light guide member and a direction of the observer.

According to a tenth aspect of the present invention, there is provided an illuminating system by overhead irradiation according to any one of the seventh to ninth aspects, wherein each of the grooves of the light guide member is a V-shaped groove having a first slope located on one side closer to the light source and a second slope located on the other side farther from the light source, and wherein an angle $\theta_2$ formed by the second slope and the bottom face of the light guide member satisfies a condition of $\theta_2 \leq (1/2)\sin^{-1}(1/n)$, where n is a refractive index of the light guide member.

According to an eleventh aspect of the present invention, there is provided an illuminating system by overhead irradiation according to any one of the seventh to tenth aspects, wherein in the light guide member, a pitch of the grooves is not more than a dot pitch of the illumination object.

According to a twelfth aspect of the present invention, there is provided an illuminating system by overhead irradiation according to any one of the seventh to eleventh aspects, wherein each of the grooves of the light guide member is a V-shaped groove having a first slope located on one side closer to the light source and a second slope located on the other side farther from the light source, and wherein in the light guide member, a length of the first slope is not more than $\{L\times(0.5/60)\times\pi/180\}$, where L is a distance between the top face of the light guide member and an observer observing the illumination object.

According to a thirteenth aspect of the present invention, there is provided an illuminating system by overhead irradiation according to any one of the seventh to twelfth aspects, wherein a transparent prism sheet is placed on the top face of the light guide member, the prism sheet having, with respect to a cross-sectional shape, a plurality of projected portions having slopes of an angle $\theta_4$ to the top face are arranged on the bottom face so that a flat portion generally parallel to the bottom face is interposed therebetween.

According to a fourteenth aspect of the present invention, there is provided an illuminating system by overhead irradiation according to the thirteenth aspect, wherein the length of the slope of the prism sheet is not more than $\{L\times(0.5/60)\times\pi/180\}$, where L is the distance between the observer who observes the illumination object and the top face of the light guide member.

According to a fifteenth aspect of the present invention, there is provided an illuminating system comprising:

a light source; and a transparent plate taking light from the light source through a side face thereof and projecting illumination light through a lower face thereof subjected to at least one of an anti-reflection treatment and a diffuse treatment, wherein an illumination object which is disposed at a lower face side of the transparent plate is observed from an upper face side of the transparent plate.

According to a sixteenth aspect of the present invention, there is provided a reflection type liquid crystal display device which comprises:

the illuminating system according to the first aspect, the transparent plate taking light from the light source through a side face thereof and projecting illumination light through a lower face thereof subjected to at least one of an anti-reflection treatment and a diffuse treatment; and a reflection type liquid crystal panel having a surface of at least one substrate thereof processed through at least one of the anti-reflection treatment and the diffuse treatment, wherein the surface of the substrate of the liquid crystal panel processed through at least one of the anti-reflection treatment and the diffuse treatment is arranged to confront a lower face of the transparent plate, so that the reflection type liquid crystal panel is observed from an upper face side of the transparent plate.

According to a seventeenth aspect of the present invention, there is provided a reflection type liquid crystal display device which comprises:

the illuminating system according to the first aspect, the transparent plate taking light from the light source through a side face thereof and projecting illumination light through a lower face thereof subjected to at least one of an anti-reflection treatment and a diffuse treatment;

a reflection type liquid crystal panel having a surface of at least one substrate thereof processed through at least either an anti-reflection treatment or a diffuse treatment; and a touch panel having a surface processed through a diffuse treatment, wherein the surface of the substrate of the liquid crystal panel processed through at least either the anti-reflection treatment or the diffuse treatment is arranged to confront the lower face of the transparent plate and at the same time, the touch panel is disposed to confront an upper face of the transparent plate, so that the reflection type liquid crystal panel is observed from an upper face side of the transparent plate.

According to an eighteenth aspect of the present invention, there is provided a reflection type liquid crystal display device according to any one of the sixteenth to seventeenth aspects, wherein a haze value of the diffuse treatment provided to the surface of the substrate of the reflection type liquid crystal panel, the lower face of the transparent plate or the surface of the touch panel is set to be not larger than 20%.

According to a nineteenth aspect of the present invention, there is provided a reflection type liquid crystal display device according to any one of the sixteenth to eighteenth aspects, wherein a transparent material or a sheet of the material which has approximately the same refractive index as that of a material of the transparent plate and that of the substrate of the reflection type liquid crystal panel is interposed between the lower face of the transparent plate and the reflection type liquid crystal panel.

According to a 20th aspect of the present invention, there is provided a reflection type liquid crystal display device which comprises:

the illuminating system according to the first aspect, the transparent plate taking light from the light source through a side face thereof and projecting illumination light from a lower face thereof, and a reflection type liquid crystal panel having an field angle control plate arranged on an upper face thereof, said control plate featuring a diffuse characteristic in one direction while being transparent in other directions, wherein the face of the reflection type liquid crystal panel where the field angle control plate is arranged is set to confront the lower face of the transparent plate, and moreover an angle of the illumination light projected from the lower face of the transparent plate is almost agreed with a diffusion direction of the field angle control plate, so that the reflection type liquid crystal panel is observed from an upper face side of the transparent plate.

According to a 21st aspect of the present invention, there is provided a reflection type liquid crystal display device according to the 20th aspect, wherein an output angle of the transparent plate and the diffusion direction of the field angle control plate is 30–50° to a normal direction of the reflection type liquid crystal panel.

According to a 22nd aspect of the present invention, there is provided an illuminating system according to the first aspect, wherein the light house is a group of point light sources in which point light sources are arranged on an almost straight line via a constant interval to radiate in nearly the same direction, the illuminating system further comprising:

a reflector having an opening part and disposed to cover the group of point light sources; and a diffusing plate set at the opening part of the reflector, wherein the diffusing plate is separated from the group of point light sources so that quantity of light from a center of an illuminance distribution by the point light source on the diffusing plate is nearly equal to that between centers of illuminance distributions of the point light sources.

According to a 23rd aspect of the present invention, there is provided an illuminating system according to the 22nd aspect, wherein the reflector is L-shaped so as not to directly pass light emitted from the point light sources to the diffusing plate.

According to a 24th aspect of the present invention, there is provided an illuminating system according to the 22nd aspect, which further comprises a light guide member which outputs light entering from a side face thereof after emitted from the diffusing plate arranged at the opening part of the reflector of the linear light source, from a lower face side thereof by grooves formed in a lower face or an upper face thereof.

BRIEF DESCRIPTION OF THE DRAWINGS

These and other aspects and features of the present invention will become clear from the following description taken in conjunction with the preferred embodiments thereof with reference to the accompanying drawings, in which:

FIGS. 9A and 9B are a schematic sectional view and a plan view of the collimator in the second embodiment;

FIG. 10 is a view for explaining operation of the collimator in the second embodiment;

DETAILED DESCRIPTION OF THE PREFERRED EMBODIMENTS

Figure 1:
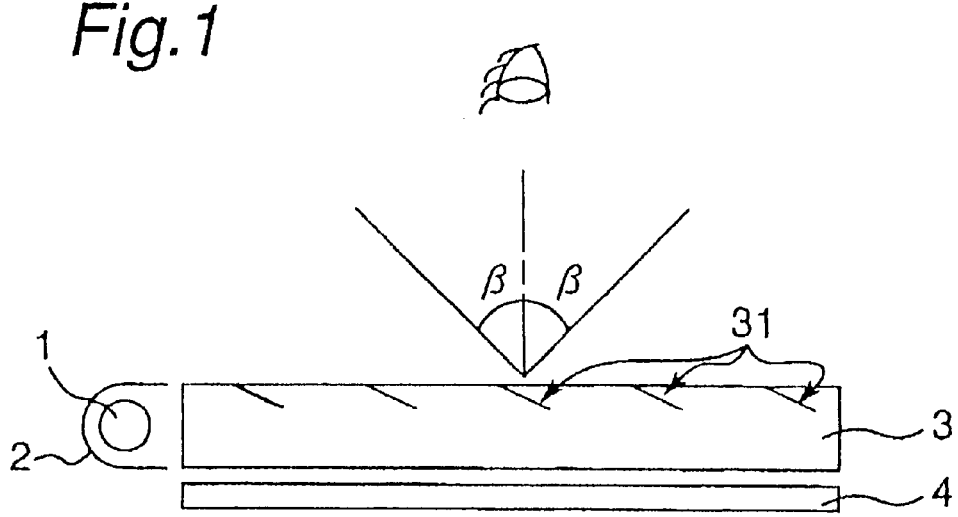
FIG. 1 is a schematic view of a cross section of an illuminating system according to a first embodiment of the present invention.

Before the description of the present invention proceeds, it is to be noted that like parts are designated by like reference numerals throughout the accompanying drawings.

Hereinbelow, an illuminating system according to a first embodiment of the present invention is described with reference to the accompanying drawings.

FIG. 1 shows a schematic view of a cross section of the illuminating system in the first embodiment of the invention without hatching in order to clearly show the lines. In the illuminating system of the first embodiment of the invention, an angle at which an observer views the illuminating system from above (hereinafter, referred to as an angle of visibility (field angle)) is assumed to $\beta$.

Referring to FIG. 1, reference numeral 1 denotes a light source, in which, for example, fluorescent lamps, such as hot cathode-ray tubes or cold cathode-ray tubes, or light emitting diodes are arrayed in a linear shape, or in which incandescent lamps or organic light-emitting materials are formed into a linear shape. The light source 1 is arranged on one side of a light guide member 3.

In FIG. 1, reference numeral 2 denotes a reflector, which is placed so as to cover the light source 1, and of which the inner surface is so made as to have a high reflectance and a small diffusivity. For example, the reflector is made up by depositing a high-reflectance material such as silver or aluminum on a resin sheet, and bonding this sheet to a thin metal plate or resin sheet. When the light source 1 is fluorescent lamp(s), it is desirable to fill the gap between the light source 1 and the reflector 2 with a material having a refractive index close to the glass' refractive index of 1.5. It is also desirable that the thickness of one side face of the light guide member 3 on the light source 1 side and the height of the reflector 2 are equal to each other. The reason for this is that whereas the light guide member 3 is desirably thinner than not, the lower limit value of the thickness is the height of the reflector 2 because of the incidence efficiency.

In FIG. 1, reference numeral 3 denotes a transparent plate (hereinafter, referred to as light guide member), which is made from a material such as quartz, glass, transparent resin like acrylic resin or polycarbonate, or the like. The top face and bottom face of the light guide member 3 are generally parallel to each other, and the light guide member 3 is generally rectangular shaped as viewed from the top. The side face and top face as well as side face and bottom face of the light guide member 3 each form an angle of nearly 90 degrees. Slits 31 as grooves are formed in the top face of the light guide member 3.

Figure 2:
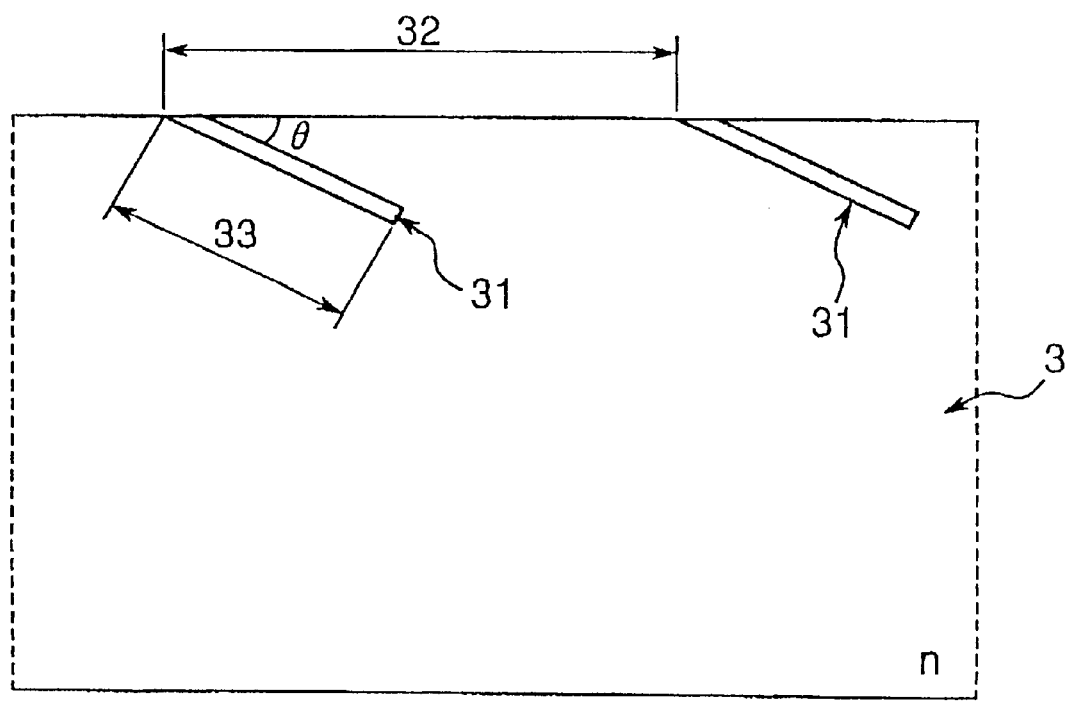
FIG. 2 is a schematic view showing an arrangement of slits in the first embodiment.

FIG. 2 shows a detailed view of a portion of the slits 31. The slits 31 extend generally parallel longitudinally of the light source 1. Each slit 31 is internally filled with a material of low refractive index, which is exemplified by air or fluorine-contained resin. Further, the slit 31 satisfies the following condition:

$$\theta < \sin^{-1}(n_1/n) - \sin^{-1}\{(1/n)\sin(\beta)\}$$

where n is the refractive index of the light guide member, $n_1$ is the refractive index of the slit interior, $\theta$ is the angle formed by the slit 31 and the top face of the light guide member and $\beta$ is the angle of visibility.

In the first embodiment, the material of the light guide member is PMMA (polymethylmethacrylate), the slit interior is air and the angle of visibility is 40 degrees. Therefore, from n=1.5, $n_1$=1 and $\beta$=40, an angle $\theta$ formed by the slit 31 and the top face of the light guide member has been set to 16 degrees. Besides, a length 33 of the slit 31 is 50 $\mu$m, and a pitch 32 of the slits 31 is 200 $\mu$m. If the angle of visibility $\beta$=30, then $\theta$=22.34°.

In FIG. 1, reference numeral 4 denotes a reflecting plate. The reflecting plate 4 means a printed article Such as a book or photograph, a screen display unit of personal computers or other office automation equipment, portable information terminals, portable video tape recorders and the like, or a reflection type liquid crystal display used in various monitors.

Figure 3:
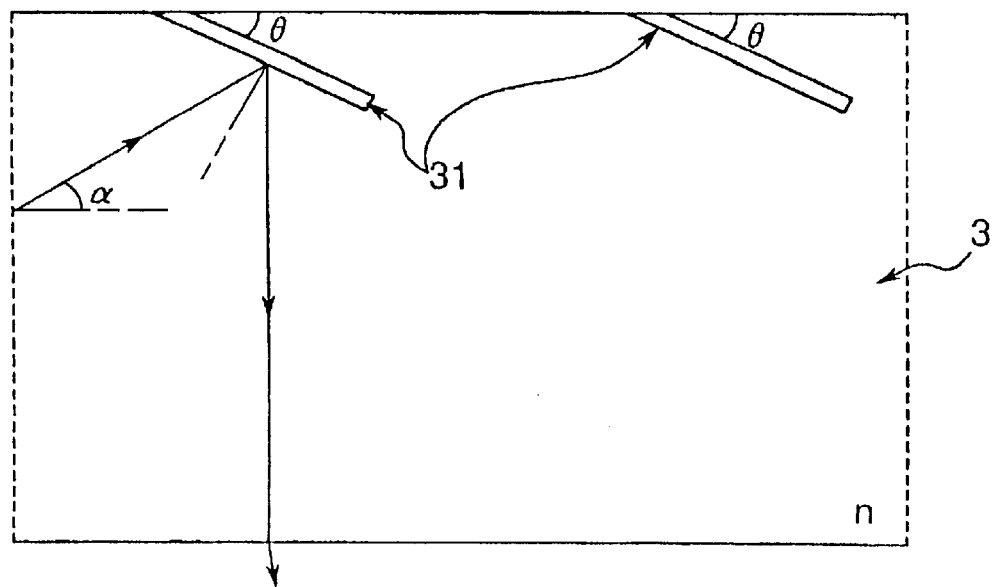
FIG. 3 is a view for explaining the propagation of light within the light guide member in the first embodiment.

Next, propagation of light within the light guide member 3 is described with reference to FIG. 3.

Light incident on the light guide member 3 results in light having a radiation distribution of $\pm\sin^{-1}(1/n)$ according to Snell's law, given that the refractive index of the light guide member 3 is n. Since most of the above-mentioned materials of the light guide member 3 have a refractive index of not less than 1.42, the radiation distribution falls within a range of ±44.77 degrees. In the light guide member 3, its top face and bottom face are generally parallel to each other, and its side face and top face as well as its side face and bottom face, the side face being planes of incidence on the light guide member 3, form an angle of nearly 90°, respectively. Therefore, when light incident on a side face of the light guide member 3 comes incident on its top face or bottom face, the minimum value of incident angle is 90−44.77= 45.23 degrees. With a refractive index of not less than 1.42, because the angle of total reflection is 44.77 degrees or lower, light incident on the side face is totally reflected by the top face and the bottom face.

At places other than near the slits 31, light that propagates through the light guide member 3 is totally reflected by flat portions of the top face and the bottom face of the light guide member 3. At the portions of the slits 31, the light is separated into transmitted beams of light and totally reflected beams of light depending on the angle of light. As shown in FIG. 3, on the assumption that the angle formed by a light beam and the top face of the light guide member 3 is $\alpha_1$ if $$\alpha > 90 - \theta - \sin^{-1}(n_1/n),$$

then the light is transmitted through the slits 31; and if $$\alpha < 90 - \theta - \sin^{-1}(n_1/n),$$

then the light is totally reflected by the slits 31.

A beam of light transmitted through the slits 31 is totally reflected by the flat portion of the top face of the light guide member 3, thus propagating again. The beam of light totally reflected by the slit 31 goes out from the bottom face of the light guide member 3, where the angle of incidence on the bottom face is $\{90-(2\theta+\alpha)\}$ and from Snell's law, if $$90-(2\theta+\alpha) < \sin^{-1}(1/n),$$

then the light beam goes out from the bottom face of the light guide member 3, thus illuminating the reflecting plate 4.

In this way, the illuminating system of the first embodiment illuminates the reflecting plate 4. Because the light emitted from the light source 1 does not need to be collimated, the light is totally reflected by the slits 31 at a high rate, so that the reflecting plate 4 can be illuminated with high efficiency. Also, the light transmitted through the slits 31 propagates once again through the light guide member 3, producing an effect that the groove lines are less visible.

Figure 4:
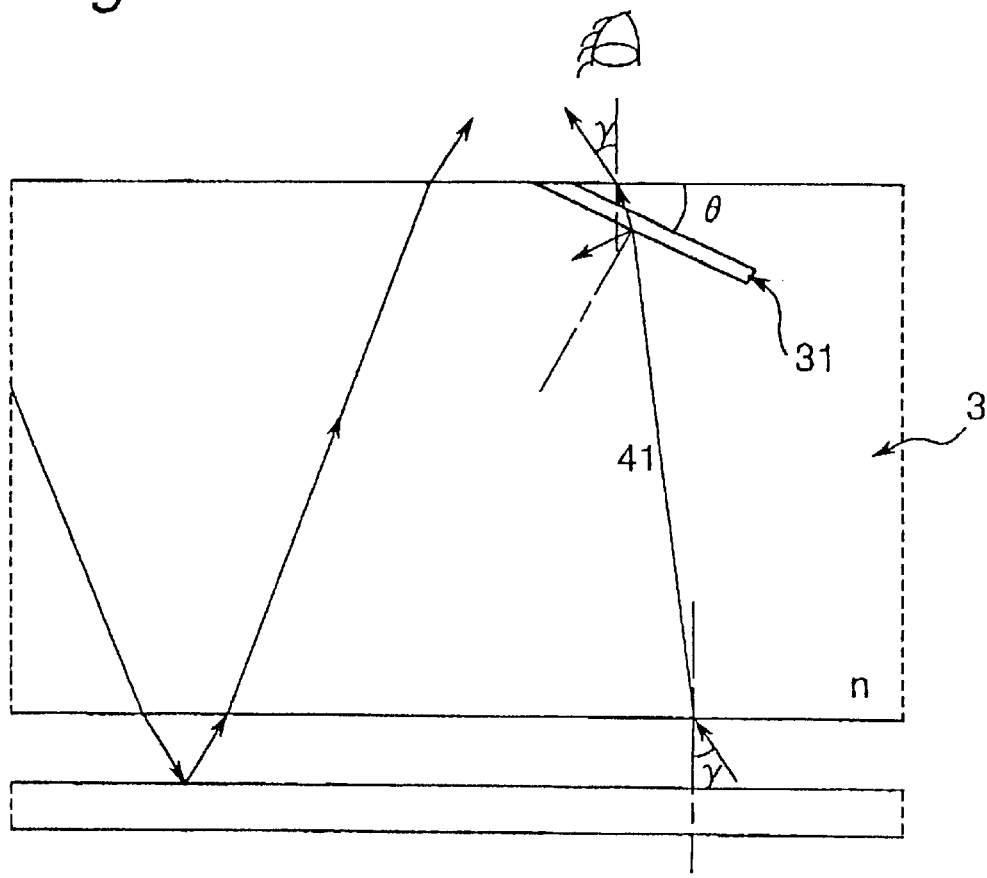
FIG. 4 is a view for explaining the propagation of reflected light within the light guide member in the first embodiment.

Next, propagation of the reflected light that has illuminated the reflecting plate 4 is described with reference to FIG. 4. Light outputted for illumination from the light guide member 3 illuminates the reflecting plate 4, and turns back as reflected light. The reflected light comes incident again on the light guide member 3 from its bottom face, and is outputted from the top face of the light guide member 3 as it is at portions other than near the slits 31.

Near the slits 31, if the angle of incidence of the reflected light on the bottom face of the light guide member 3 is γ, then $$\theta + \sin^{-1}\{(1/n)\sin(\gamma)\} > \sin^{-1}(n_1/n),$$

the light is totally reflected by the slits 31. On this account, upon incidence of the reflected light 41 on the bottom face of the light guide member 3 at an angle γ, if γ>β, then the reflected light 41 is totally reflected by the slits 31, not reaching the observer; if γ≦β, then the reflected light 41 is transmitted through the slits 31, reaching the observer.

From this fact and another that the angle θ of the slits 31 is $$\theta < \sin^{-1}(n_1/n) - \sin^{-1}\{(1/n)\sin(\beta)\},$$

the reflected light is not totally reflected by the portions of the slits 31 in a range of the angle of visibility ±β. Thus, the observers field of view is not obstructed, and a successful image can be obtained.

As shown above, according to this first embodiment, the illuminating system which makes the groove lines of the light guide member 3 less visible, maintains an image of reflected light successful and offers a good illuminating efficiency can be provided. Also, since uniform illumination is enabled and the light outputted from the light source 1 does not need to be collimated, the reflector 2 can be reduced in size. Moreover, since the height of the reflector 2 and the height of the side face of the light guide member 3 are made generally equal to each other as described above, the thickness of the side face of the light guide member 3 can be reduced according to the height of the reflector 2.

Figure 11:
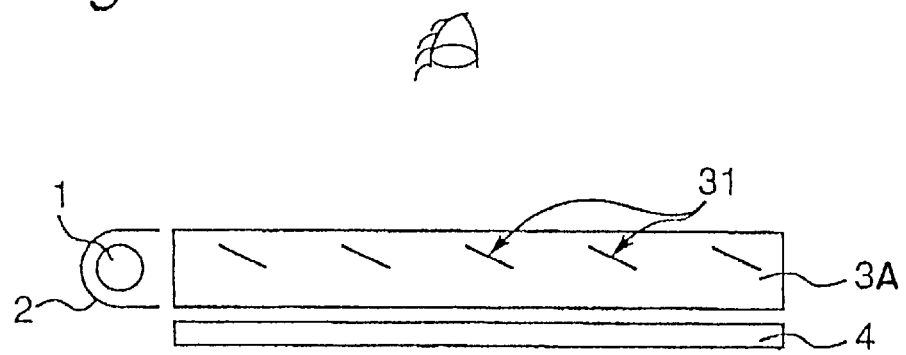
FIG. 11 is a schematic view of a cross section of a modification of the illuminating system of the first embodiment of the invention.
Figure 12:
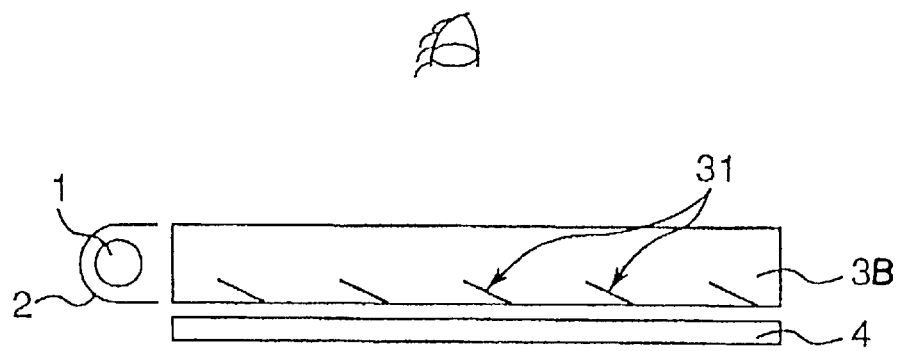
FIG. 12 is a schematic view of a cross section of another modification of the illuminating system of the first embodiment of the invention.
Figure 13:
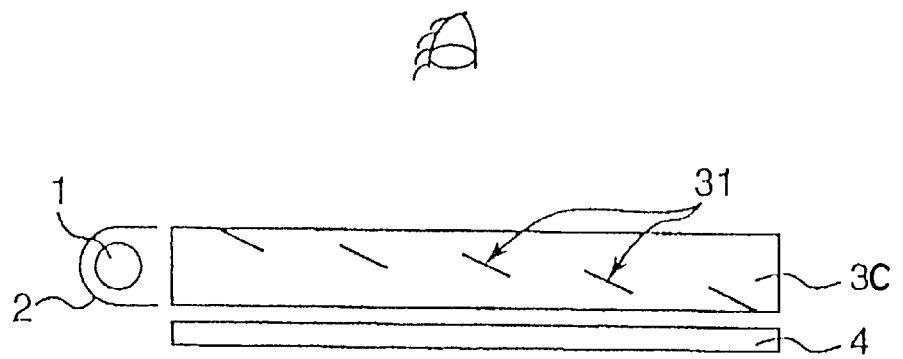
FIG. 13 is a schematic view of a cross section of still another modification of the illuminating system of the first embodiment of the invention.

In addition, in the first embodiment, the slits 31 have been arranged in the top face of the light guide member 3. However, it is also possible that the slits 31 are arranged between the top face and the bottom face of the light guide member 3A as shown in FIG. 11, or in the bottom face of the light guide member 3B as shown in FIG. 12, or obliquely in a direction from the top face side to the bottom face side of the light guide member 3C as shown in FIG. 13.

Further, although the top face and bottom face of the light guide member 3 are parallel to each other in the first embodiment, they may be non-parallel.

Furthermore, although the pitch 32 of the slits 31 has been made to be a constant interval in the first embodiment, making the pitch 32 decreasing with an increasing distance from the light source 1 for the light guide member 3 causes the brightness difference between near places and far places from the light source 1 to be reduced, so that more uniform illumination can be obtained. Making the length 33 of the slits 31 increasing with an increasing distance from the light source 1 for the light guide member 3 also allows similar effects to be obtained. Still also, making the angle θ of the slits 31 increasing with an increasing distance from the light source 1 allows similar effects to be obtained.

Now, an illuminating system according to a second embodiment of the present invention is described below with reference to FIG. 5.

Figure 5:
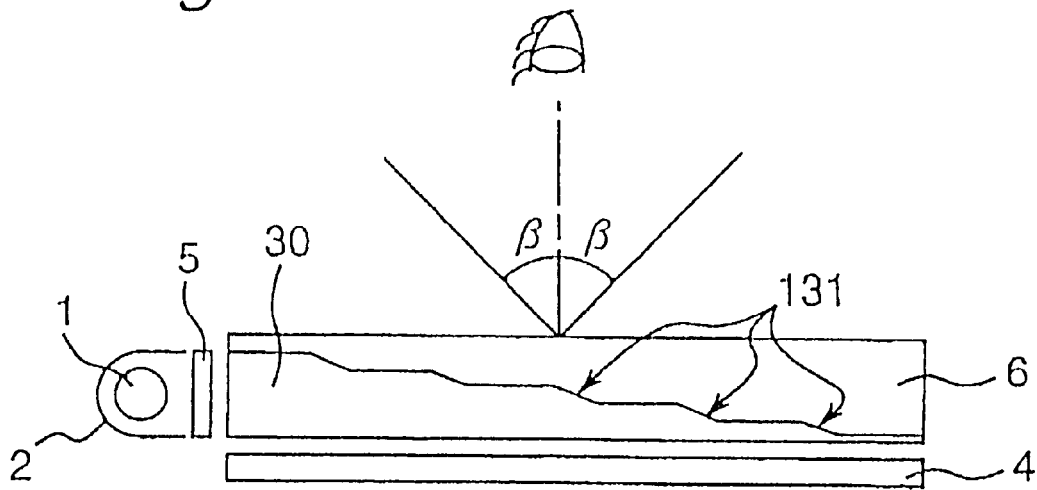
FIG. 5 is a schematic view of a cross section of an illuminating system according to a second embodiment of the present invention.

FIG. 5 is a schematic view of a cross section of the illuminating system in the second embodiment of the invention. In the illuminating system of the second embodiment of the invention, the angle of visibility is assumed as β.

In FIG. 5, the light source 1 and the reflector 2 are similar to those of the first embodiment.

Referring to FIG. 5, reference numeral 30 denotes a light guide member as an example of the first transparent plate, and 6 denotes a compensating plate as an example of the second transparent plate placed on the light guide member 30. Reference numeral 5 denotes a collimator placed between the light source 1 and the light guide member 30, and the collimator 5 collimates light emitted from the light source 1. Output characteristic of the collimator 5 is within $\pm\sin^{-1}[n \times \sin\{90-\theta-\sin^{-1}(n_2/n)\}]$, where $\theta$ is the angle of a stepwise slope 131 of the top face of the light guide member 30, n is the refractive index of the light guide member 30 and $n_2$ is the refractive index of the material between the light guide member 30 and the compensating plate 6.

For example, if $\beta=40$, n=1.5 and $n_2=1$, then $\theta=16°$, where the output characteristic of the collimator 5 is $\pm52.13°$. Also, if $\beta=30$, n=1.5 and $n_2=1$, then $\theta=22.34$, where the output characteristic of the collimator 5 is $\pm40.85°$.

The structure of the collimator 5 can be implemented by, for example, a plano-convex cylindrical lens satisfying the above output characteristic. Further, the collimator 5 may also be a diffraction grating. Besides, with a large angle of visibility $\beta$ of the illuminating system, the output characteristic angle of the collimator 5 is so large that the collimator 5 may be omitted.

Figure 6:
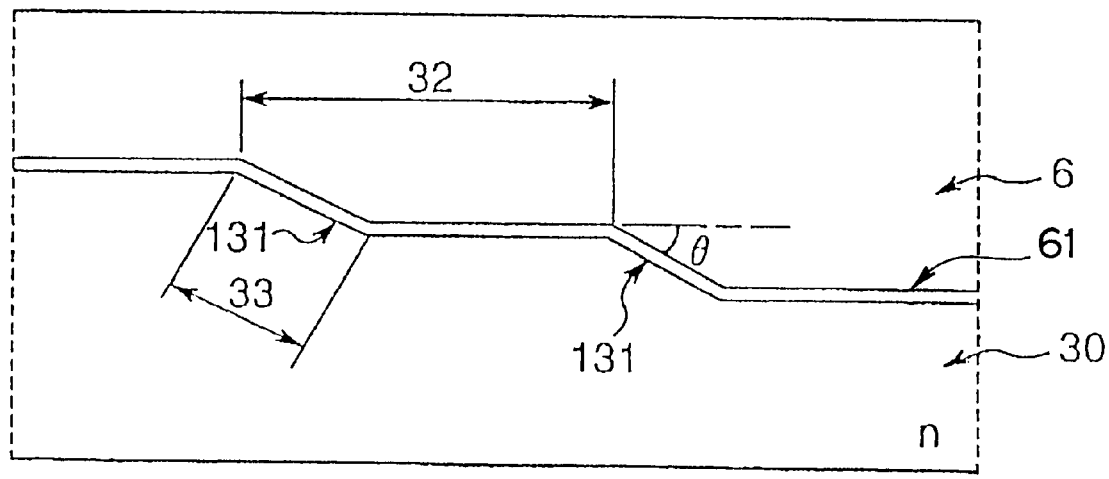
FIG. 6 is a view for explaining the propagation of light within the light guide member in e second embodiment.

The light guide member 30 is made from a material such as quartz, glass, transparent resin like acrylic resin or polycarbonate, or the like. FIG. 6 shows a detailed view of the light guide member 30. A bottom face of the light guide member 30 is a plane surface, and a plurality of stepwise slopes 131 are arranged at specified intervals in the top face of the light guide member 30. The slopes 131 are generally parallel to the longitudinal direction of the light source 1.

Assuming that the angle of each slope 131 is $\theta$, the refractive index of the material of the light guide member 30 is n, the refractive index of the material between the light guide member 30 and the compensating plate 6 is $n_2$ and that the angle of visibility is $\beta$, then angle $\theta$ of the slope 131 is $$\theta < \sin^{-1}(n_2/n) - \sin^{-1}\{(1/n)\sin(\beta)\}.$$

A pitch 32 of the slopes 131 is preferably decreasing with an increasing distance from the light source 1 for the light guide member 30. Also, a length 33 of the slopes 131 may be increasing with an increasing distance from the light source 1 for the light guide member 30. Further, the angle $\theta$ of the slopes 131 may be increasing with increasing distance from the light source 1. The light guide member 30 is generally rectangular shaped as viewed from the top.

The compensating plate 6 is made from a material such as quartz, glass, transparent resin like acrylic resin or polycarbonate, or the like. In the compensating plate 6, stepwise slopes 61 are arranged in its bottom face so as to be identical in configuration to the slopes 131 of the top face of the light guide member 30, and the top face of the compensating plate 6 is a plane surface. The top face of the light guide member 30 and the bottom face of the light guide member 30 are placed at a specified spacing.

In FIG. 5, reference numeral 4 denotes a reflecting plate. The reflecting plate 4 means a printed article such as a book or photograph, a screen display unit of personal computers or other office automation equipment, portable information terminals or portable video tape recorders, a reflection type liquid crystal display used in various monitors or the like.

Figure 7:
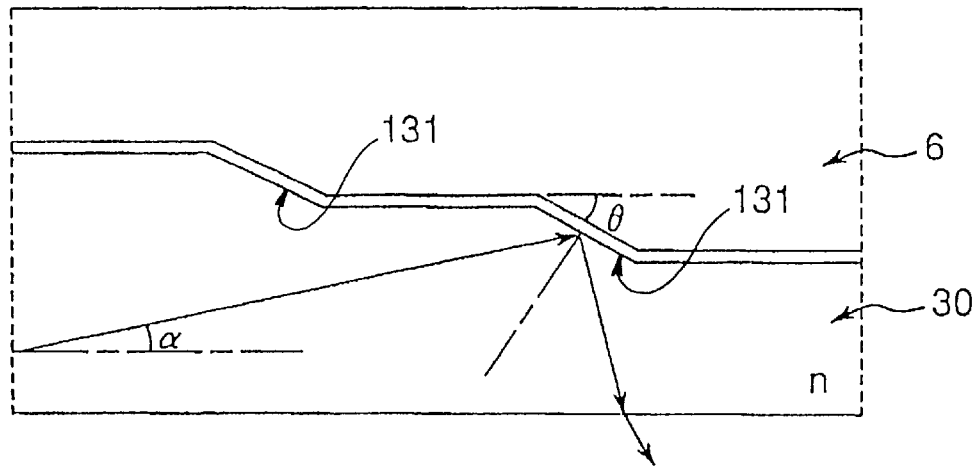
FIG. 7 is a view for explaining the propagation of light within the light guide member in the second embodiment.

Next, propagation. of light within the light guide member 30 in the second embodiment is described with reference to FIG. 7. Light incident on the light guide member 30 propagates while being totally reflected by flat portions of the top face or bottom face of the light guide member 30 at places other than near the slopes 131 of the light guide member 30. At the portions near the slopes 131 of the light guide member 30, the light is separated into transmitted beams of light and totally reflected beams of light depending on the angle of the light. On the assumption that the refractive index of the light guide member 30 is n, the refractive index of the material between the light guide member 30 and the compensating plate 6 is $n_2$, the angle formed by the bottom face of the light guide member 30 and the light is $\alpha_1$ and that the angle of the slopes 131 of the light guide member 30 is $\theta$, if $$\alpha > 90 - \theta - \sin^{-1}(n_2/n)$$

then the light is transmitted through the slopes 131 of the light guide member 30; and if $$\alpha < 90 - \theta - \sin^{-1}(n_2/n)$$

then the light is totally reflected by the slopes 131 of the light guide member 30.

The light transmitted through the slopes 131 of the light guide member 30 will not be reflected until it reaches one side of the compensating plate 6 opposite to the light source 1 side. Therefore, the light is highly likely to go out toward the observers side, causing a deterioration of the illuminating efficiency. However, because the output characteristic of the collimator 5 for the light source 1 is within $\pm\sin^{-1}[n \times \sin\{90-\theta-\sin^{-1}\{n_2/n)\}]$, the light incident on the light guide member 30 is within $\pm\{90-\theta-\sin^{-1}(n_2/n)\}$, satisfying the condition of Equation $\alpha < 90-\theta-\sin^{-1}(n_2/n)$, so that most of the light is totally reflected by the slopes 131 of the light guide member 30, illuminating the reflecting plate 4.

Therefore, the light, emitted from the light source 1 is enabled to display the reflecting plate 4 with high efficiency. Also, since the reflecting plate 4 is illuminated with high efficiency in this way, less light is transmitted through the slopes 131 of the light guide member 30 to the observer side, producing an effect that the groove lines are less visible.

Figure 8:
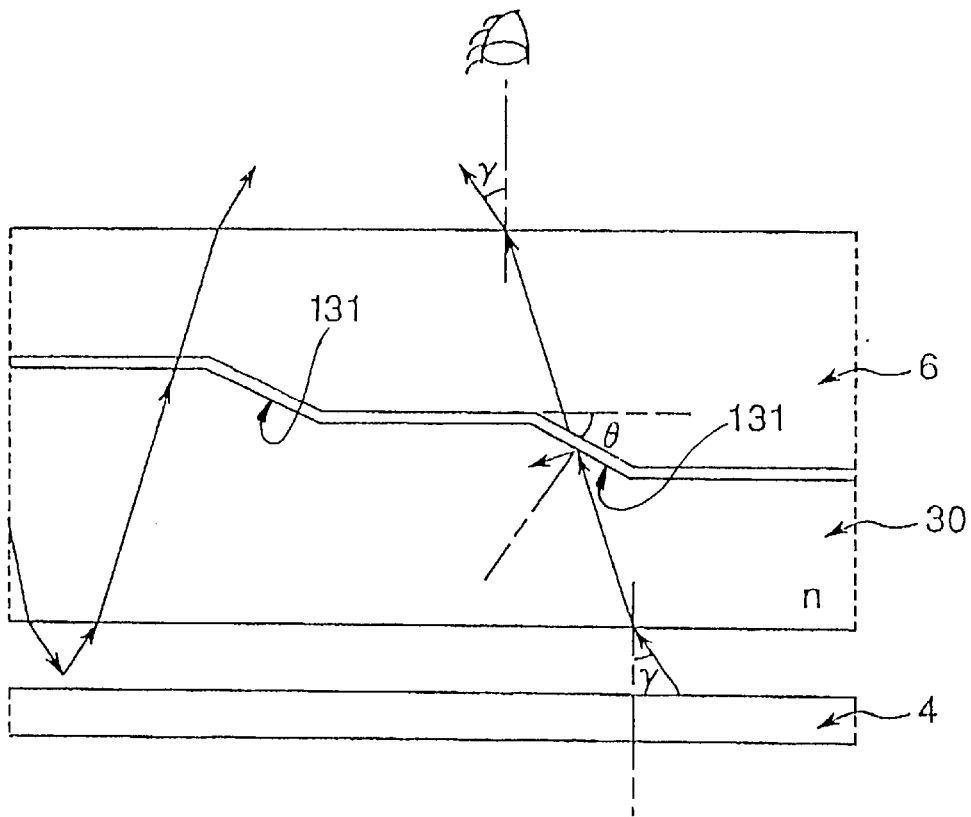
FIG. 8 is a view for explaining the propagation of reflected light within the light guide member in the second embodiment.

Next, propagation of the reflected light that has illuminated the reflecting plate 4 is described with reference to FIG. 8. The light beam outputted for illumination from the light guide member 30 illuminates the reflecting plate 4, and turns back as reflected light. The reflected light comes incident again on the light guide member 30 from its bottom face, and is outputted from the top face of the light guide member 30 as it is at portions other than near the slopes 131 of the light guide member 30.

Near the slopes 131 of the light guide member 30, on the assumption that the angle of incidence of the reflected light on the bottom face of the light guide member 30 is $\gamma$, if $$\theta + \sin^{-1}\{(1/n)\sin(\gamma)\} > \sin^{-1}(n_2/n),$$

then the light is totally reflected by the slopes 131 of the light guide member 30. On this account, upon incidence of the reflected light 41 on the bottom face of the light guide member at an angle $\gamma$, if $\gamma > \beta$, then the reflected light 41 is totally reflected by the slopes 131, not reaching the observer; if $\gamma \leq \beta$, the reflected light 41 is transmitted through the slopes 131, reaching the observer.

From this fact and another that the angle $\theta$ of the slopes 131 of the light guide member 30 is $$\theta < \sin^{-1}(n_2/n) - \sin^{-1}\{(1/n)\sin(\beta)\},$$

the reflected light is not totally reflected by the portions of the slopes 131 of the light guide member 30 in a range of the angle of visibility $\pm\beta$. Thus, the observers field of view is not obstructed, and a successful image can be obtained.

As shown above, according to the second embodiment, the illuminating system which makes groove lines of the light guide member 30 less visible, maintains an image of reflected light successfully and offers a good illuminating efficiency can be provided.

Figure 14:
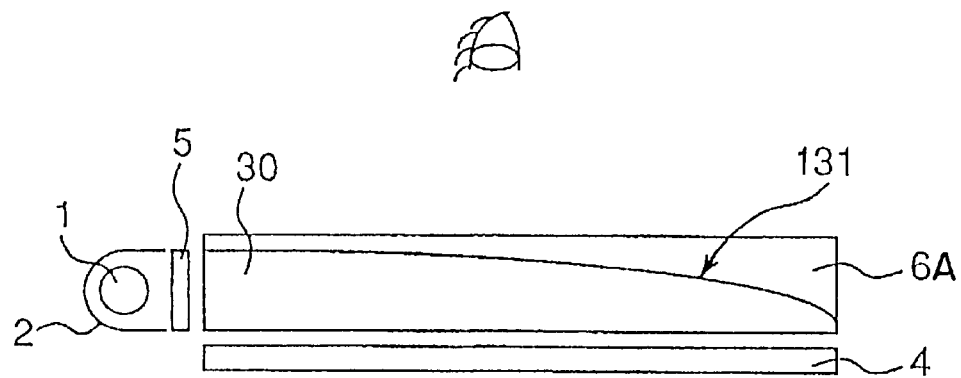
FIG. 14 is a schematic view of a cross section of an example of the illuminating system of the second embodiment of the invention.

In addition, although the groove has been formed stepwise in the second embodiment, the groove may also be an arbitrary curve as shown in FIG. 14. Further, although the pitch 32 of the slopes 131 has been a constant interval in the second embodiment, making the pitch 32 decreasing with increasing distance from the light source 1 for the light guide member 30 causes the brightness difference between near places and far places from the light source 1 to be reduced, so that more uniform illumination can be obtained. Making the length 33 of the slopes 131 increasing with increasing distance from the light source 1 for the light guide member 30 also allows similar effects to be obtained. Still also, making the angle θ of the slopes 131 increasing with increase distance from the light source 1 allows similar effects to be obtained.

In addition, although the groove has been formed stepwise in the second embodiment, the groove may also be an arbitrary curve as shown in FIG. 14. In FIG. 14, 6a denotes a compensation plate. Further, although the pitch 32 of the slopes 131 has been a constant interval in the second embodiment, making the pitch 32 decreasing with increasing distance from the light source 1 for the light guide member 30 causes the brightness difference between near places and far places from the light source 1 to be reduced, so that more uniform illumination can be obtained. Making the length 33 of the slopes 131 increasing with increasing distance from the light source 1 for the light guide member 30 also allows similar effects to be obtained. Still also, making the angle θ of the slopes 131 increasing with increase distance from the light source 1 allows similar effects to be obtained.

Figure 17:
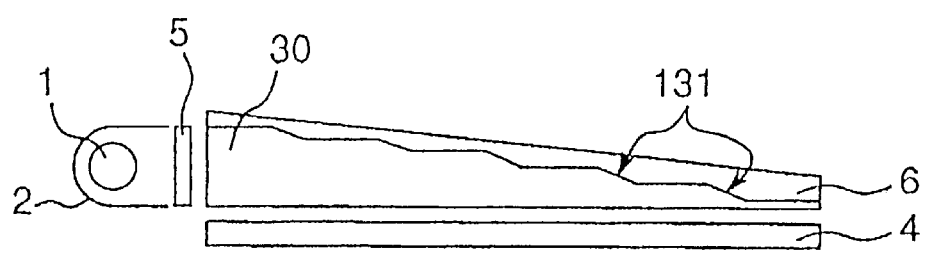
FIG. 17 is a schematic view of a cross section of a modification of the illuminating system of the second embodiment of the invention.
Figure 18:
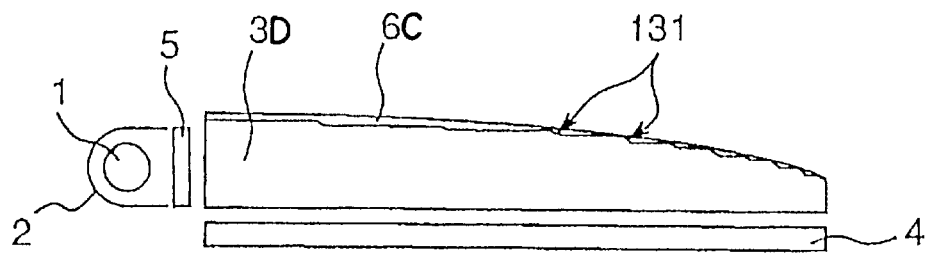
FIG. 18 is a schematic view of a cross section of another modification of the illuminating system of the second embodiment of the invention.

Also, even if the top face of the compensating plate 6B and the bottom face of the light guide member 30 are not parallel to each other as shown in FIG. 17, similar effects can be obtained. In FIG. 17, 6B denotes a compensating plate.

Now, an illuminating system according to a third embodiment of the present invention is described below.

The third embodiment of the invention is almost similar in structure to the second embodiment, and differs therefrom only in the structure of the collimator 5.

The structure of the collimator 5 of the third embodiment is described with reference to FIG. 9. A light incident surface 51 of the collimator 5 is a plane surface. An output surface 52 of the collimator 5 is so structured as to have a plurality of conical recessed portions with apex angle 2δ.

On the assumption that the refractive index of the light guide member 30 is n, the refractive index of the material bonding the light guide member 30 and the compensating plate 6 to each other is $n_2$ and the refractive index of the collimator 5 is $n_3$, δ is a value that satisfies the equation:

$$\sin^{-1}[n \times \sin\{90-\theta-\sin^{-1}(n_2/n)\}] = 90-\theta-\sin^{-1}[n_3 \times \sin(90-\delta-\sin^{-1}(1/n_3))].$$

Next, operation of the collimator 5 is described with reference to FIG. 10. Light emitted from the light source 1, when incident on the incident surface 51 of the collimator 5, results in a radiation distribution of $\pm\sin^{-1}(1/n_3)$. Therefore, the angle of light incident on the slopes 52 of the collimator 5 on its output side can be determined geometrically, where an incident-angle minimum value $i_{min}$ is $$i_{min}=90-\delta-\sin^{-1}(1/n_3),$$

and the incident—angle maximum value $i_{max}$ is $$i_{max}=90.$$

Also, the angle of light outputted from the collimator 5 can be determined by Snell's law, where an outgoing angle minimum value $o_{min}$ with respect to the slope 52 on the outgoing side is $$o_{min}=\sin^{-1}\{n_3 \times \sin(i_{min})\},$$

and an outgoing angle maximum value $o_{max}$ is $$o_{max}=90.$$

Because the slope 52 on the outgoing side is tilted by δ with respect to the optical axis, an outgoing angle maximum value $\omega_{max}$ is $$\omega_{max}=90-\delta-o_{min},$$

and the outgoing angle minimum value $\omega_{min}$ is $$\omega_{min}=-\delta.$$

That is, $$\omega_{max}=90-\delta-\sin^{-1}[n_{3 \times sin}\{90-\delta-\sin^{-1}(1/n_3)\}],$$

$$\omega_{min}=-\delta.$$

In this connection, if the angle of the slope 131 of the light guide member 30 is θ and the refractive index of the material between the light guide member 30 and the compensating plate 6 is $n_2$, then necessary output characteristic of the collimator 5 is within $\pm\sin^{-1}[n \times \sin\{90-\theta-\sin^{-1}(n_2/n)\}]$. Because δ is a value satisfying the equation, $\sin^{-1}[n \times \sin\{90-\theta-\sin^{-1}(n_2/n)\}]=90-\delta-\sin^{-1}[n_3 \times \sin\{90-\delta-\sin^{-1}(1/n_3)\}]$, $\omega_{max}$=(output characteristic of collimator 5), thus satisfying a desired output characteristic.

For example, if angle of visibility β=30, n=1.5, $n_2$=1 and $n_3$=1.5, then θ=22.4 so that the necessary output characteristic is 40.85°, where with δ=46.2°, the resulting outgoing angle is $\omega_{max}$=+40.81° and $\omega_{min}$=−46.2°, so that a desired output characteristic of the collimator 5 is obtained. Also, if δ is a value satisfying an equation, $\delta=\sin^{-1}[n \times \sin\{90-\theta-\sin^{-1}(n_2/n)\}]$, then, in the above example, δ=40.85°, $\omega_{max}$=+38.10° and $\omega_{min}$=−40.85° so that a desired output characteristic of the collimator 5 is obtained. In addition, under the above conditions, δ may be an arbitrary value of not less than 40.85° and not more than 46.2°.

As shown above, with the use of the third embodiment, the collimator 5 which satisfies the output characteristic necessary for the light guide member 30 can be implemented and the same effects as in the second embodiment can be obtained.

Figures 15A, 15B:
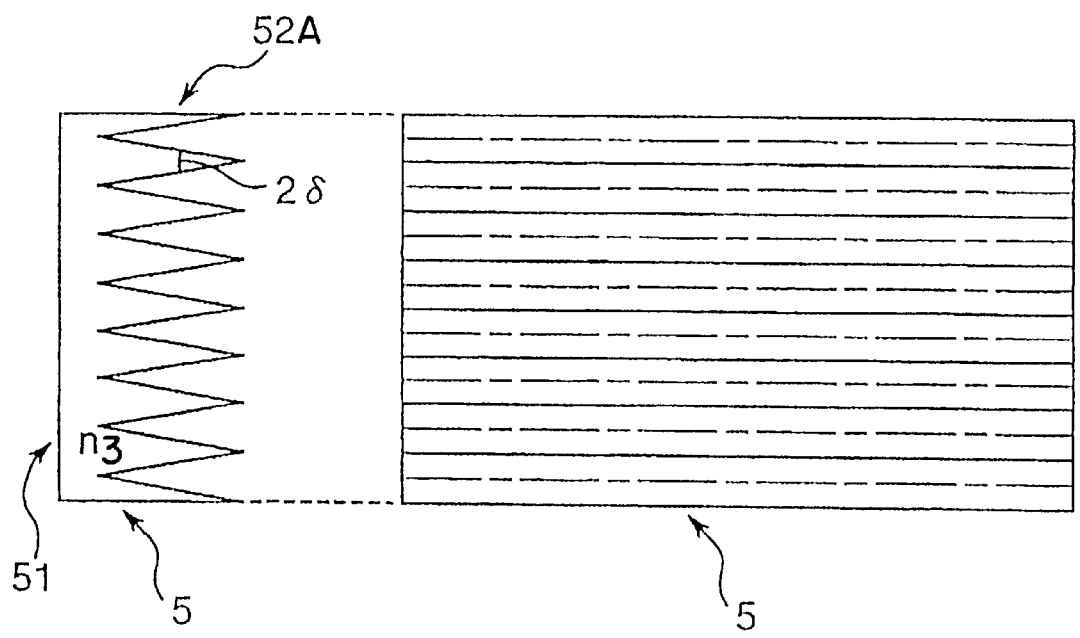
FIGS. 15A and 15B are a schematic sectional side view and a plan view of the collimators the illuminating system in the third embodiment.
Figure 16:
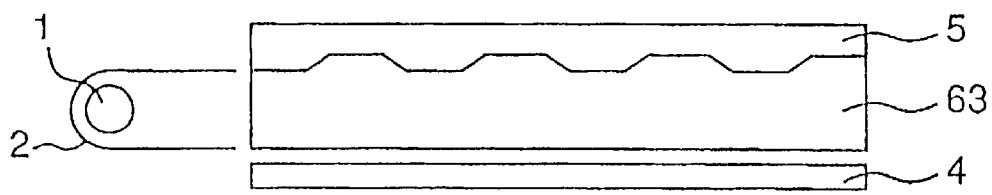
FIG. 16 is a schematic view of a cross section of an illuminating system according to prior art.

In addition, the outgoing surface 52 of the collimator 5 has been shaped into conical recessed portions with the apex angle 2δ in the third embodiment. However, the outgoing surface 52 may also be shaped into conical protrusions with the apex angle 2δ. Further, the outgoing surface 52 may be shaped into polygonal pyramids having a cross section with the apex angle 2δ instead of the conical shape. Still further, the outgoing surface 52A may be shaped into parallel grooves with the acute angle 2δ as shown in FIGS. 15A, 15B.

According to the present invention, light emitted from the light source becomes incident ah the transparent plate, and propagates on and on while being iteratively totally reflected within the transparent plate. During this process, the light is separated into totally reflected beams of light by the slits provided inside the transparent plate and transmitted beams of light depending on the angle of light. The totally reflected beams of light are changed in angle so as to be smaller than the total reflection angle, thus being outputted to the bottom face side of the transparent plate. Also, the transmitted beams of light are totally reflected by the top face of the transparent plate so as to continuously propagate within the transparent plate, thus groove lines of the transparent plate being less visible. Further, the light is transmitted through the grooves and the collimator that has conventionally been needed to make the groove lines less visible is no longer needed, so that almost all the beams of light are outputted to the bottom side of the transparent plate, thus offering a good illuminating efficiency.

The light outgoing from the bottom face of the transparent plate illuminates an illumination object, and reflected light from the illumination object is made to be incident again on the transparent plate, where because $$\theta < \sin^{-1}(n_1/n) - \sin^{-1}\{(1/n)\sin(\beta)\},$$

a successful image can be displayed without being affected by the angle of visibility (field angle).

Thus, an illuminating system which makes groove lines less visible and has a good illuminating efficiency can be provided.

In other words, as described above, according to the present invention, a light source, for example a linear light source, is placed beside a side face of a flat-shaped light guide member, and slits as an example of grooves are arranged inside the light guide member so as to extend generally parallel to the light source, by which most of the light that propagates within the light guide member can be outputted from the light guide member by total reflection at the slits formed in the light guide member so that a reflecting plate as an example of the illumination object can be illuminated. Also, because beams of light transmitted without being totally reflected by the slits propagate again within the light guide member, the groove lines are less visible, and because the reflected light from the reflecting plate is transmitted to the observer side without being distorted, a successful image quality of the reflecting plate can be maintained. Further, because the light emitted from the light source does not need to be collimated, the illuminating system can be downsized, and because all the beams of light are outputted from the light guide member by the total reflection at the slits, a good illuminating efficiency can be obtained. Further, by arranging the slits at a specified angle, the brightness difference between the slits and portions other than the slits is made smaller within the observer's field of view, so that a successful image quality of reflected light can be maintained.

According to the present invention, light emitted from the light source is collimated by the collimator and introduced to the first substrate. The light incident on the first substrate is totally reflected by the slopes of the first substrate, where the angle of light is changed so as to be smaller than the total reflection angle, thus being outputted to the bottom face side.

Also, the light outputted from the bottom face of the first substrate illuminates an illumination object, and reflected light from the illumination object is made to be incident again on the first substrate, where the presence of the second substrate eliminates any distortion of the image, and if $$\theta < \sin^{-1}(n_1/n) - \sin^{-1}\{(1/n)\sin(\beta)\},$$

a successful image can be displayed without being affected by the angle of visibility.

Also, if the light outgoing angle of the collimator is within $\pm\{90-\theta-\sin^{-1}(n_1/n)\}$, then all of the beams of light emitted from the light source can be totally reflected by the slopes of the first substrate to illuminate the illumination object therewith, thus offering a good illuminating efficiency.

Thus, an illuminating system which makes the groove lines less visible, maintains image quality of reflected light successful and offers a good illuminating efficiency can be provided.

In other words, according to the present invention, a light source, for example a linear light source, is placed beside a side face of a light guide member as an example of a first transparent plate, and light emitted from the light source is collimated by a collimator. Also, in the configuration of the light guide member, a bottom face of the light guide member is a plane surface and slopes are provided at a specified angle in the top face of the light guide member, and to this light guide member is bonded a compensating plate as an example of a second transparent plate whose top face is a plane surface and whose bottom face has grooves of the same configuration as in the light guide member formed therein, by which most of the light that propagates within the light guide member is totally reflected by the stepwise slopes of the light guide member so as to be outputted from the light guide member, thus allowing the reflecting plate as an example of the illumination object to be illuminated. Further, because the presence of the compensating plate allows the reflected light from the reflecting plate to be transmitted to the observer's side without being distorted, a successful image quality of the reflecting plate can be maintained. Further, because the light emitted from the light source is collimated into a specified angle by the collimator, the light is not transmitted from the light guide member to the compensating plate, allowing the reflecting plate to be illuminated with high efficiency and besides making the groove lines less visible. Further, by making the stepwise slopes into a specified angle, the brightness difference between the stepwise slopes and portions other than the slopes can be made, smaller within the observer's field of view, so that a successful image quality of the reflected light can be maintained.

Further, according to still another aspect of the present invention, the collimator which satisfies the output characteristic necessary for the light guide member can be implemented, and the same effects as in the foregoing aspects can also be obtained.

Figure 35:
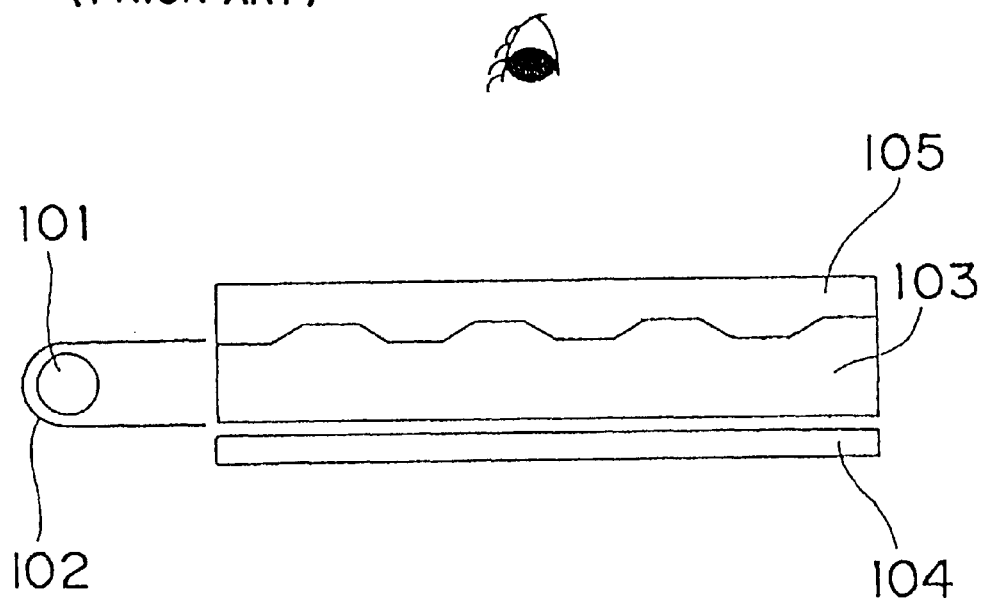
FIG. 35 is a cross-sectional schematic view of an illuminating system according to the prior art.

FIG. 35 is a schematic cross-sectional view of an illuminating system. As shown in FIG. 35, the illuminating system comprises a light source 101, a reflector 102, a light guide member 103 and a compensating plate 105. In order that the reflector 102 collimates the light emitted from the light source 101, the distance from the light source 101 to a side face of the light guide member 103 is elongated. The light guide member 103 has a function of totally reflecting and propagating the light introduced from the reflector 102, and a function of illuminating a reflecting plate 104 by totally reflecting the light with slopes of grooves formed in its top face to change the angle of the light. The compensating plate 105 has a function of correcting any distortion that occurs when the reflected light from the reflecting plate 104 passes the light guide member 103.

However, since the illuminating system has a double sheet construction of the light guide member 103 and the compensating plate 105 and since the light guide member 103 and the compensating plate 105 are bonded together with their grooves identical in shape, their alignment may be difficult to accomplish and the fabrication costs high.

Therefore, following embodiments of the present invention have an aim of solving these issues.

Hereinbelow, an illuminating system by overhead irradiation according to a third embodiment of the present invention is described with reference to the accompanying drawings.

Figure 19:
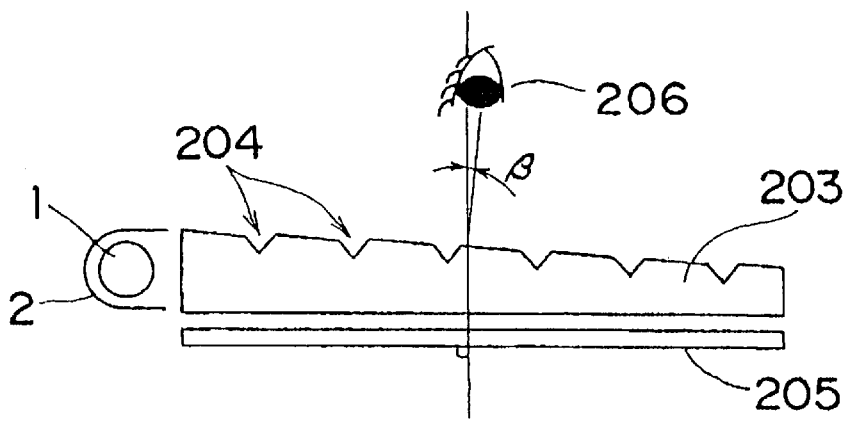
FIG. 19 is a s schematic view of the illuminating system by overhead irradiation according to a third embodiment of the present invention.
Figure 32:
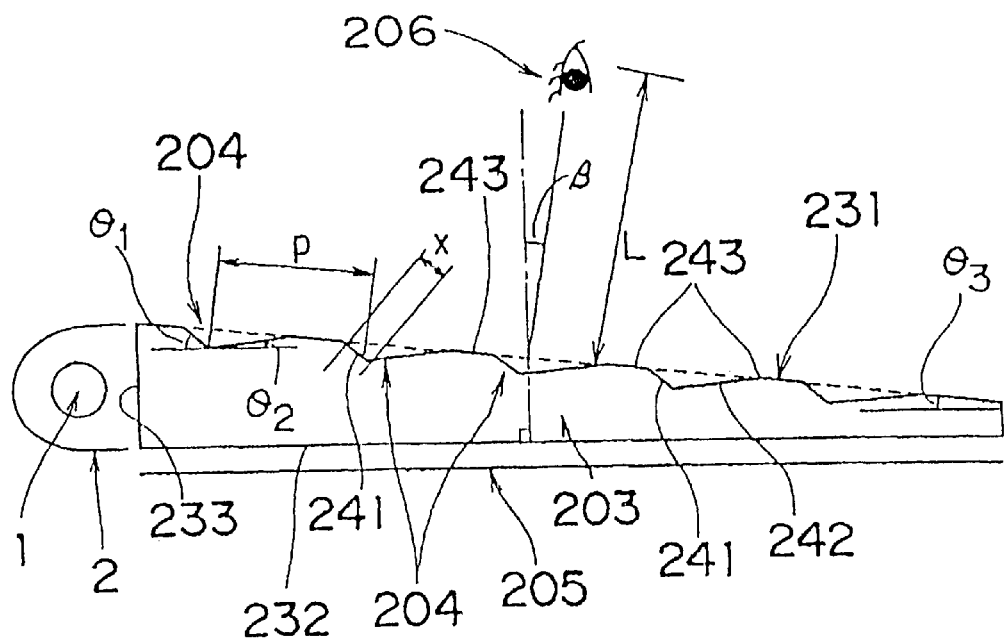
FIG. 32 is a more detailed cross-sectional schematic view of the illuminating system by overhead irradiation in the third embodiment.

FIGS. 19 and 32 are a schematic view and a more detailed schematic view, respectively, of a cross section of the illuminating system by overhead irradiation in the third embodiment of the invention.

Referring to FIG. 19, reference numeral 1 denotes a light source, in which a plurality of, for example, fluorescent lamps, such as hot cathode-ray tubes or cold cathode-ray tubes, or light emitting diodes are arrayed in a linear shape, or in which incandescent lamps or organic light-emitting materials are formed into a linear shape. The light source 1 is arranged on one side of a light guide member 203.

In FIG. 19, reference numeral 2 denotes a reflector, which is placed so as to cover the light source 1, and of which the inner surface is so made as to have a high reflectance and a small diffusivity. For example, the reflector is made up by depositing a high-reflectance material such as silver or aluminum on a resin sheet, and bonding this sheet to a thin metal plate or resin sheet. When the light source 1 is a fluorescent lamp, it is desirable to fill the gap between the light source 1 and the reflector 2 with a material having a refractive index close to the glass' refractive index of 1.5. It is also desirable that the thickness of one side face of the light guide member 203 on the light source 1 side and the height of the reflector 2 are equal to each other.

Figure 20:
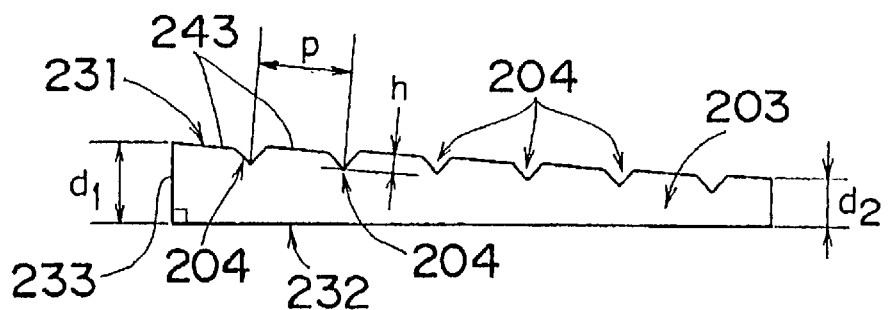
FIG. 20 is a cross-sectional schematic view of the light guide member in the third embodiment.

In FIG. 19, a light guide member 203 is, as an example, a transparent plate (hereinafter, referred to as light guide member), which is made from a material such as quartz, glass, transparent resin like acrylic resin or polycarbonate, or the like. As shown in FIG. 20, the light guide member 203 is set to a size equivalent to the size of an illumination object. A bottom face 232 and an incident surface 233 of the light guide member 203 form an angle of about 90 degrees. The light guide member 203 is generally wedge shaped as a whole, and a top face 231 of the light guide member 203 is tilted so as to be gradually closer to the bottom face 232 of the light guide member 203 with increasing distance from the light source 1. That is, if the thickness of the side face 233 of the light guide member 203 on the light source side is d1 and the thickness of the other side face on the side opposite to the light source 1 is d2, then d1≧d2. The relationship of these thicknesses may be that d1=d2 basically, but a relationship of d1>d2 allows the brightness to be maintained uniform, further favorably. Also, a plurality of V-shaped grooves 204 are formed in the top face 231 of the light guide member 203.

Figure 21:
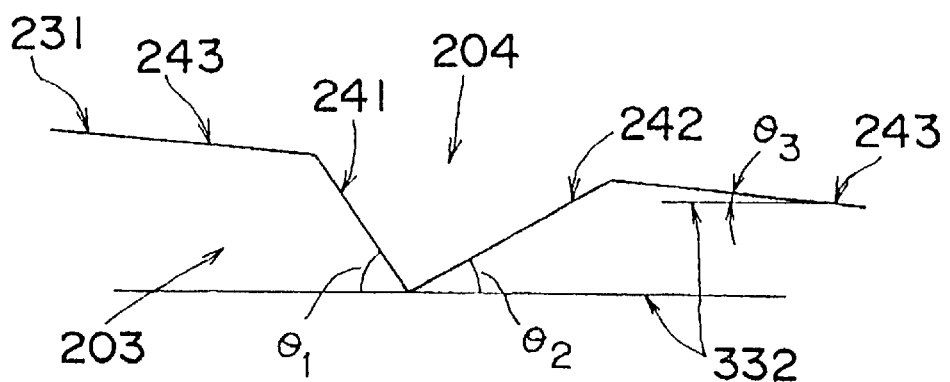
FIG. 21 is a cross-sectional schematic view showing in detail the groove in the third embodiment.

FIG. 21 shows a detailed view of the groove 204. The groove 204 is formed so as to extend generally parallel to the longitudinal direction of the light source 1 (a direction vertical to the drawing sheet), and V-shaped in its cross section. A slope of the groove 204 on the light source side is referred to as a first slope 241. A slope of the groove 204 on the side opposite to the light source 1 is referred to as a second slope 242. Further, a portion of the light guide member top face 231 where no groove 204 is present is referred to as a flat portion 243. The flat portions 243 constitute a part of the top face 231 that are one plane. An angle $\theta_1$ formed by the light guide member bottom face 232 and the first slope 241 of the groove 204 is within a range that $\theta_1 \leq 90°-\theta_c+2\theta_3$ and that $\theta_1 \approx 45°\theta_3-(1/2)\sin^{-1}(1/n\times\sin\beta)$, where $\theta_c$ is the total reflection angle, $\theta_3$ is the angle formed by the flat portion 243 and the light guide member bottom face 232 and β is the angle formed by a perpendicular of the bottom face 232 and the observer's direction. In addition, in FIG. 21, reference numeral 332 denotes an imaginary plane parallel to the bottom face 232.

An angle $\theta_2$ formed by the light guide member bottom face 232 and the second slope 242 of the groove 204 is $\theta_2 \leq (1/2)\sin^{-1}(1/n)$, where n is the refractive index of the light guide member 203.

It is noted that as shown in FIG. 20, both pitch p and depth h of the groove 204 are based on the top face 231 as a reference plane.

In FIG. 19, on the other hand, reference numeral 205 denotes a reflecting surface. The reflecting surface 205 is a printed article such as a book or photograph, a screen display unit of personal computers or other office automation equipment, portable information terminals, portable video tape recorders and the like, or a reflection type liquid crystal display used in various monitors.

Also in FIG. 19, reference numeral 206 denotes an observer (more precisely, an observers eye). The observer 206 views the reflecting surface 205 through the light guide member 203.

Next, operation of the illuminating system according to the third embodiment of the present invention is described.

Light that has been thrown from the light source 1 to be incident on the light guide member 203 at its incident surface 233 results in light having a radiation distribution of $\pm\sin^{-1}(1/n)$ centered on the 0° direction according to Snell's law, given that the refractive index of the light guide member 203 is n. Since most of the material of the light guide member 203 has a refractive index of not less than 1.42, the radiation distribution falls within a range of ±44.77°. Therefore, the incident light beam propagates within the light guide member 203 at the radiation distribution of ±44.77°. The light beam incident on the light guide member bottom face 232 has an incident angle of 90°−44.77°=45.23° or more, which is larger than the total reflection angle, so that the light beam is totally reflected by the light guide member bottom face 232.

Figure 22A:
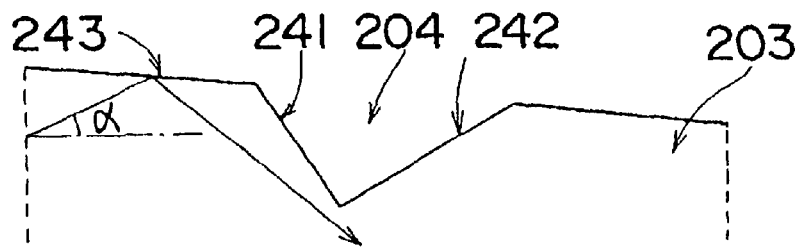
FIGS. 22A, 22B, 22C, 22D, 22E are views for explaining the reflection of light at the top face of the light guide member in the third embodiment.
Figure 22B:
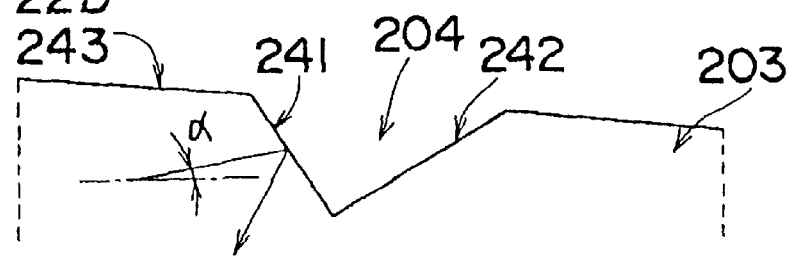
Figure 22C:
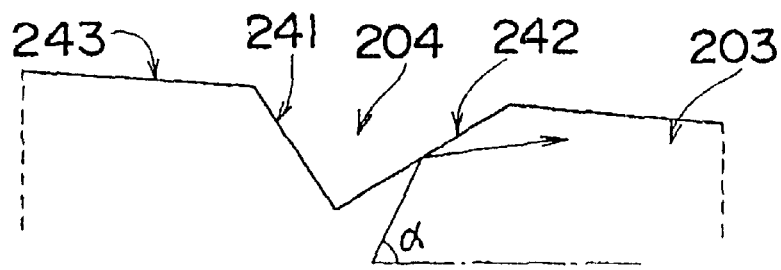

Next, operation of the light at the light guide member top face 231 is described with reference to the accompanying drawings. The light guide member top face 231 is so structured that a plurality of the flat portion 243 and a plurality of the grooves 204 each composed of the first slope 241 and the second slope 242 are arranged, and the reflection at the light guide member top face 231 is classified into the following five patterns as shown in FIGS. 22A–22E. The first pattern of FIG. 22A is light incident on the flat portion 243. A second pattern of FIG. 22B is light incident on the first slope 241. A third pattern of FIG. 22C is light incident on the second slope 242. In the following description, a is assumed to be an angle formed by the light guide member bottom face 232 and the light reaching the light guide member top face 231. Because the light reaching the light guide member top face 231 is light having a distribution of the positive direction out of the light having the radiation distribution of $\pm\sin^{-1}(1/n)$ centered on 0°, α is not less than 0° and the light has the maximum radiation distribution at 0°.

In the first pattern of FIG. 22A, the light is incident on the flat portion 243 at an incident angle of $\{90°-\alpha-\theta_3\}$. Because $\theta_3$ is a small value, most of light is reflected. The light reflected by the flat portion 243 results in an angle of $\{-\alpha-2\times\theta_3\}$.

In the second pattern of FIG. 22B, the light is incident on the first slope 241 at an incident angle of $\{90°-\alpha-\theta_1\}$. The light that has been incident on the first slope 241 is partly reflected by Fresnel reflection and partly transmitted to be a loss. The light reflected by the first slope 241 results in an angle of light of $\{-\alpha-2\theta_1\}$.

In the third pattern of FIG. 22C, the light is incident on the second slope 242 at an incident angle of $\{90°-\alpha+\theta_2\}$. Since the light reflected by the second slope 242 results in an angle of light of $\{-\alpha+2\theta_2\}$, the reflected light, when $\theta_2$ is a small value, results in more parallel light than the light which is prior to the reflection.

Actually, the light is reflected in a composite combination of the first to third patterns. Although not limited because of differences depending on the size of the illuminating system, the groove height h is set to around 5 $\mu$m–25 $\mu$m and the pitch p is set to around 100 $\mu$m to 250 $\mu$m in this case. As a result, a few rays of light, after being reflected by the flat portion 243, are reflected by the first slope 241 (in a combination of the first pattern and the second pattern). This pattern is referred to as a fourth pattern of FIG. 22D.

Figure 22D:
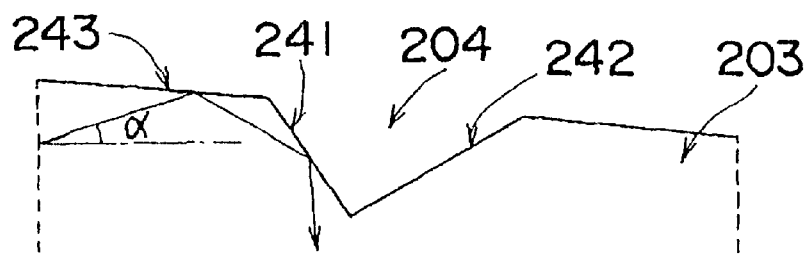

In the fourth pattern of FIG. 22D, the light is incident on the first slope 241 at an incident angle of $\{90°-(-\alpha-2\times\theta_3)-\theta_1\}$. In this case, since $\theta_1$ satisfies that $\theta_1 \leq 90°-\theta_c+2\theta_3$, the incident angle onto the first slope 241 is $90°-(-\alpha-2\times\theta_3)-\theta_1 \geq \alpha+\theta_c$ (where $\theta_c$ is the total reflection angle). Because $\alpha$ is not less than 0°, all the rays of light are larger than the total reflection angle and are totally reflected, preferably. In addition, $\theta_1$, when not more than 20°, would cause a difficulty in the view of the observer 206, so that $\theta_1$ is preferably set to an angle over 20°.

The light reflected by the first slope 241 results in an angle of light of $\{\alpha+2\times\theta_3-2\times\theta_1\}$, and becomes incident on the light guide member bottom face 232 at an incident angle of $\{90°+\alpha+2\times\theta_3-2\times\theta_1\}$. In this case, since $\theta_1$ satisfies that $\theta_1 \approx 45°+\theta_3-(1/2)\sin^{-1}(1/n\times\sin\beta)$, the incident angle on the bottom face 232 is $90°+\alpha+2\times\theta_3-2\times\theta_1 \approx \alpha+\sin^{-1}(1/n\times\sin\beta)$. It is noted here that $\beta$ is the angle formed by the direction perpendicular to the reflecting surface 205 and the direction of observation by the observer 206 as shown in FIG. 19, that is, $\beta$ indicates the direction of the observer 206.

Since $\alpha$ is at least 0°, the light is incident on the bottom face at an angle distribution centered on the angle $\sin^{-1}(1/n\times\sin\beta)$. Accordingly, the light goes out from the light guide member bottom face 232 at an angle distribution centered on the angle $\beta$, which is favorable for observation in the direction of angle $\beta$, thus allowing an adjustment to a direction easier for the observer to view. Also, the closer to 0° the value of $\alpha$ is, the narrower the radiation angle distribution centered on the direction of angle $\beta$ becomes, preferably.

Also, when $\theta_2$ is a small value, not a few rays of light, after being reflected by the second slope 242, are reflected by the flat portion 243 to be incident on the first slope 241 (a combination of the first, second. and third patterns). This pattern is referred to as a fifth pattern of FIG. 22E.

Figure 22E:
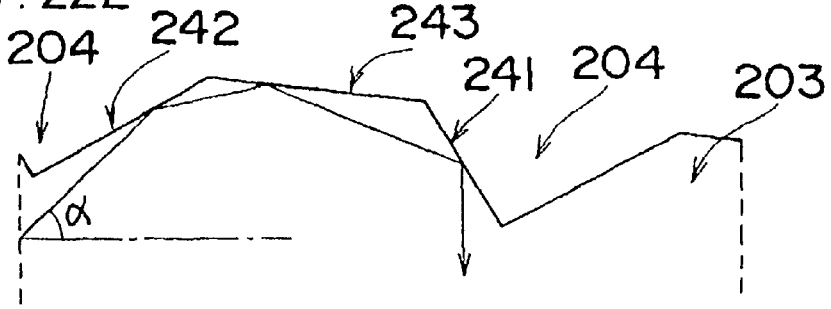

In the fifth pattern of FIG. 22E, since the light reflected by the second slope 242 results in $\{-\alpha+2\theta_2\}$, the reflected light, when $\theta_2$ is a small value, results in more parallel light than before it is reflected. Therefore, the light reflected by the second slope 242 is totally reflected by the flat portion 243 and the first slope 241 as described in the fourth pattern of FIG. 22D, and the distribution of radiation angle from the light guide member bottom face 232 after the total reflection becomes narrower, preferably.

Although not limited because of differences depending on the size of the illuminating system, the concrete value of $\theta_2$ is at least such an angle that light reaches the second slope 242 and results in parallel rays of light. Therefore, $\theta_2$ is such an angle that a ray of light having the maximum angle of $\alpha$, $\sin^{-1}(1/n)$ is reflected toward the 0° direction, i.e., $\theta_2 \leq (1/2)\sin^{-1}(1/n)$.

Further, on the assumption that the flat portion 243 is absent, the necessity of the flat portion 243 is described below. Out of the light that reaches the light guide member top face 231, light of $0<\alpha<\theta_2$ cannot reach the second slope 242, as can be easily understood, thus reaching the first slope 241. Therefore, the light is partly reflected by Fresnel reflection but partly transmitted to be a loss. Also, light of $\theta_2<\alpha<2\theta_2$, when reflected by the second slope 242, results in a ray of light having an angle of $-\alpha+2\theta_2$ as described in the third pattern, so that $0<\alpha<\theta_2$. Accordingly, the light is Fresnel—reflected by the first slope 241 or transmitted to be a loss. Further, light of $2\theta_2<\alpha<\{\sin^{-1}(1/n)\}$ is reflected by the second slope 242 so that $\{-\sin^{-1}(1/n)+2\theta_2\}<\alpha<0$. The light that is reflected by the second slope 242 partly reaches the first slope 241 successfully, but partly does not reach the first slope 241 so as to be directed toward the light guide member bottom face 232. Therefore, the rate of light of $0<\alpha<\theta_2$ increases so that the light is transmitted by the first slope 241 to be a loss at a higher probability. Hence it can be said that the flat portion 243 is necessary.

As a result of the above, light reflected by the grooves 204 is outputted from the bottom face 232 of the light guide member 203. Its outgoing angle, although not limited because of differences depending on the characteristics of the reflecting plate 205, is desirably along the direction p in which the observer 206 usually observes.

Light outputted from the light guide member bottom face 232 reaches the reflecting plate 205, being thereby reflected. The reflected light passes again through the light guide member 203, reaching the observer 206. When this occur, a large distortion of the light guide member 203 due to the grooves 204 would cause groove lines to be conspicuous, inappropriately.

However, if the grooves 204 are provided at such a pitch p not more than the minimum resolution (dot pitch) of the reflecting plate 205 such that more fringes are not formed, only the light transmittance of each dot affects the image quality and the distortion of each dot does never affects the image quality.

Further, although not limited because of differences among applications, a length x of the first slope 241 of the groove 204, if not more than $\{L\times(0.5/60)\times\pi/180\}$, makes the groove lines inconspicuous on the ground that the human eye's minimum resolution is 0.5 minute, where L is the distance at which usually the screen is viewed (a distance between the observer 206 and the top face 231 of the light guide member 203). For example, if L is 35 cm, then groove lines of not more than $\{35\times(0.5/60)\times\pi/180\}=50$ $\mu$m can be said to be inconspicuous.

Thus, it is preferable that the pitch p is not more than the dot pitch of the reflecting plate 205 or that the length $x=h/\tan(\theta_1)$ of the first slope 241 is not more than $\{L\times(0.5/60)\times\pi/180\}$, where L is the distance at which the observer 206 usually views the screen (the distance between the observer 206 and the top face 231 of the light guide member 203), in which case the groove lines are inconspicuous.

As shown above, the light emitted from the light source 1 is outputted from the light guide member bottom face 232 by the first slopes 241 of the grooves 204, illuminating the reflecting plate 205, in which case the light density would decrease with increasing distance from the light source 1, resulting in non-uniform brightness distribution. However, because the thickness d1 of the side face of the light guide member 203 on the light source 1 side and the thickness d2 of the side face of the light guide member 203 on the side opposite to the light source 1 have a relationship of d1$\geq$d2, the light density is maintained constant so that the brightness distribution becomes constant.

It is also preferable to make the pitch p decreasing with increasing distance from the light source 1, in which case the brightness distribution becomes more uniform.

It is also preferable to increase the depth h at places far from the light source 1, in which case the brightness distribution becomes more uniform.

Thus, according to this third embodiment, there can be provided the illuminating system by overhead irradiation which is simple in construction, good at illuminating efficiency, inconspicuous in groove lines and uniform in brightness distribution.

Concrete numerical values for the third embodiment may be exemplified as follows. From the viewpoint of a setting under the critical angle, a value of $\theta_1 \leq 49.8°$ is set in the condition that $\theta_1 \leq 90° - \theta_c + 2\theta_3$, for an improvement of brightness. Also, the outgoing angle is set by setting a value of $\theta_1 \approx 46.2°$ for $\beta = 30°$ in the condition that $\theta_1 \approx 45° + \theta_3 - (1/2)\sin^{-1}(1/n \times \sin\beta)$. Also, from the viewpoint of improving the reflectance at the first slope 241 of the groove 204 of the light guide member 203 by making the rays of light parallel, a value of $\theta_2 \leq 20.9°$ is set in the condition that $\theta_2 \leq (1/2)\sin^{-1}(1/n)$, for an improvement of brightness. Further, the pitch p of the grooves 204 is set to not more than 250 μm so as to be not more than the dot pitch of the reflecting plate 205, for a reduction in the groove lines. Further, a value of $x \leq 50.9$ μm is set in the condition that the length of the first slope 241 of the groove 204, $x \leq \{L \times (0.5/60) \times \pi/180\}$, for a reduction of the groove lines. In addition, this example is based on the assumption that the refractive index of the light guide member 203, n=1.5, the angle formed by the top face 231 and the bottom face 232 of the light guide member 203, $\theta_3 = 0.8°$ and that the distance between the top face 231 of the light guide member 203 and the observer 206, L=350 mm.

In the third embodiment, it was found as a result of simulation experiments that the length of the flat portion is preferably about five times as long as the length of the first slope, in which case rays of light in the fifth pattern account for larger portion.

It is noted here that the present invention is not limited to the above third embodiment, and may be embodied in various ways.

For example, it is preferable to provide a protective layer on the surface of the light guide member 203 in the third embodiment, in which case deteriorations of the appearance due to flaws or the like can be prevented. Hard coating agents as an example of the material that forms the protective layer can be exemplified by thermosetting silicon base agents with importance laid on the coating function, ultraviolet-curing acrylic agents or ultraviolet-curing silicon base agents with importance laid on the coating workability, and the like.

Further, in the third embodiment, a transparent sheet made of acryl or polycarbonate or the like may be provided instead of the protective layer. It is also possible to provide a protective layer on these transparent sheets.

It is also preferable to provide an anti-reflection coating on the top face 231 of the light guide member 203 in the third embodiment, in which case the image from the reflecting plate 205 becomes sharp.

It is also possible that a collimator for collimating the light of the horizontal direction with respect to the light source 1 is attached to a side face 233 of the light guide member 203 on the light source side in the third embodiment. The radiation distribution of light emitted from the light source 1 has a spread in not only the vertical direction but also horizontal direction to the light source 1. On this account, the light can be effectively utilized by suppressing the horizontal rays of light by the collimator. In other words, the front brightness is enhanced by narrowing the radiation brightness distribution in both right and left directions.

Figure 23A:
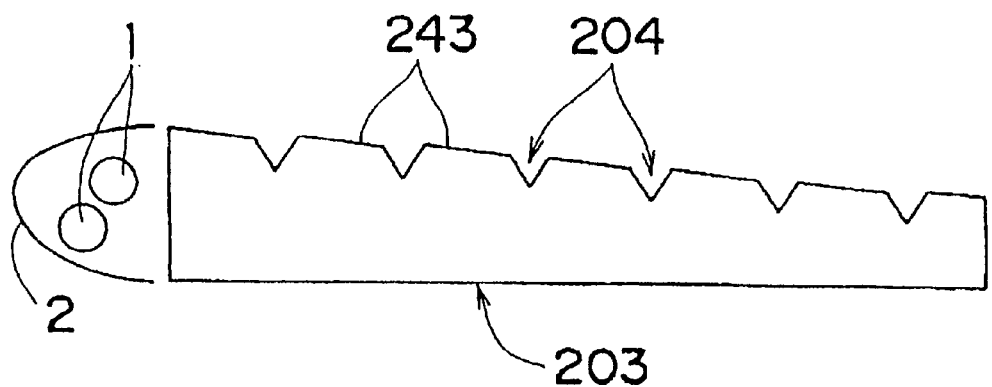
FIGS. 23A, 23B, 23C are cross-sectional schematic views showing another example of the illuminating system in the third embodiment.
Figure 23B:
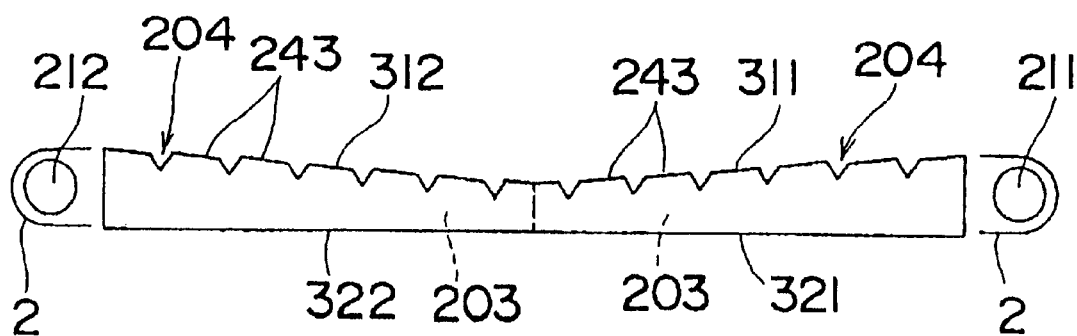
Figure 23C:
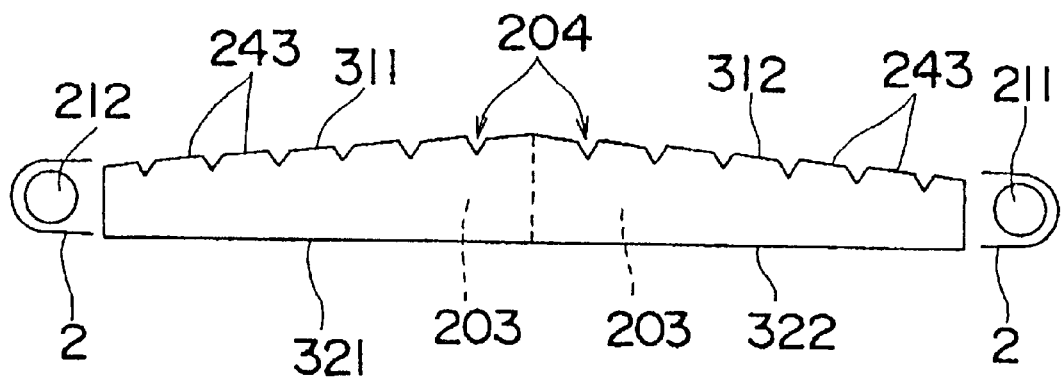

Furthermore, as a modification of the third embodiment, two or more fluorescent lamps may be used for a large-screen reflecting plate with a 13 inch or more diagonal, by which the brightness can be maintained, favorably. Examples of this modification are shown in FIGS. 23A, 23B, 23C. One exemplary way is, as shown in FIG. 23A, to place two or more lamps at the site of the light source 1. Another way is, as shown in FIG. 23B, to prepare two light guide members 203 of the third embodiment and place them opposite to each other with their smaller-thickness side faces adjoining. With this constitution, light emitted from a right-side light source 211 is internally reflected by a top face 311 of the right-side light guide member 203 so as to be outputted from a bottom face 321, while light emitted from a left-side light source 212 is internally reflected by a top face 312 of the left side light guide member 203 so as to be outputted from a bottom face 322, so that the brightness is maintained for the large screen, favorably.

Still another way is, as shown in FIG. 23C, to prepare two light guide a members 203 of the third embodiment and position them back to back with their larger-thickness side faces adjoining. With this constitution, light emitted from a right-side light source 211 is internally reflected by a top face 312 of the left-side light guide member 203 so as to be outputted from a bottom face 322, while light emitted from a left-side light source 212 is internally reflected by a top face 311 of the right-side light guide member 203 so as to be outputted from a bottom face 321, so that the brightness is maintained for the large screen, favorably.

For a small-screen reflecting plate with a 4 inch or less diagonal, employing light emitting diodes or the like as the light source 1 is suited for miniaturization, preferably. In this case, because the radiation distribution of light emitting diodes has some degree of directivity, the reflector 2 may be omitted.

As described above, according to the third embodiment, light emitted from the light source 1 becomes incident on the light guide member 203, and propagates on and on while being iteratively totally reflected within the light guide member 203. During this process, the light is totally reflected by the grooves 204, . . . , 204 provided in the top face of the light guide member 203, being changed into an angle of light smaller than the total reflection angle and so outputted to the bottom face side, thus illuminating an illumination object 205. The reflection at the grooves 204 is composite reflection at the first slopes 241, the second slopes 242 and the flat portions 243. Therefore, if the angle of the first slope 241 is not more than $\{90° - \theta_c + 2\theta_3\}$, the reflectance becomes high so that the illuminating efficiency is improved.

Further, the angle of light emitted from the light guide member 203 by the first slope. 241 varies. On this account, if the angle of the first slope 241 is $\{45° + \theta_3 - (1/2)\sin^{-1}(1/n \times \sin\beta)\}$, then the angle of outgoing light becomes in the $\beta$ direction so that angle of outgoing light can be aligned along the easy-to-view angle for the observer 206.

Also, if the angle of the second slope 242 is not more than $\{(1/2)\sin^{-1}(1/n)\}$, then the light reflected by the second slope 242 becomes more parallel rays of light. On this account, the light that reaches the firs; slope 241 or the flat portion 243 after being reflected by the second slope 242 is reflected at higher reflectance. Thus, the illuminating efficiency is improved.

Further, if the pitch of the grooves 204, . . . , 204 is not more than the dot pitch of the illumination object 205, then the groove lines become inconspicuous so as not to be an obstacle to the observer 206.

Also, if the length x of the first slope 241 is not more than {Lx(0.5/60)xπ/180}, where L is the distance between the observer 206 and the top face of the light guide member 203, then the groove lines become inconspicuous so as not to be an obstacle to the observer 206 on the ground that the human eye's resolution is 0.5 minute.

Thus, there can be provided the illuminating system by overhead irradiation which is simple in construction, good at illuminating efficiency and inconspicuous in groove lines.

Next, an illuminating system by overhead irradiation according to a fourth embodiment of the present invention is described with reference to the accompanying drawings.

The illuminating system of the fourth embodiment of the invention is generally similar in construction to the illuminating system of the third embodiment, and differs therefrom only in that a transparent plate 207 is placed on the light guide member 203.

Figure 24:
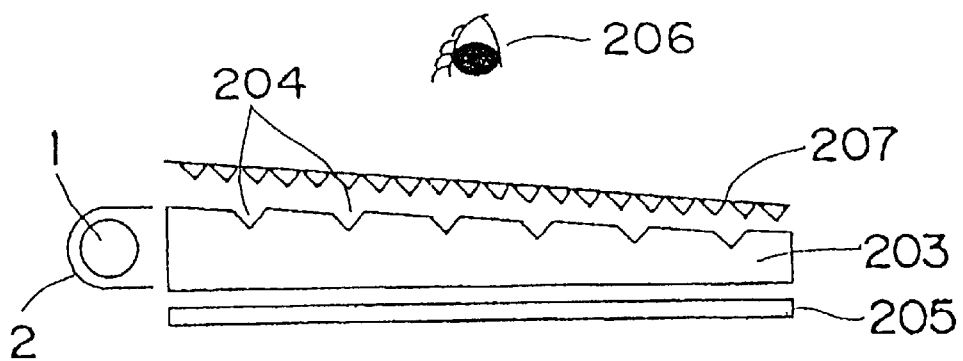
FIG. 24 is a cross-sectional schematic view of an illuminating system by overhead irradiation according to a fourth embodiment of the present invention.
Figure 33:
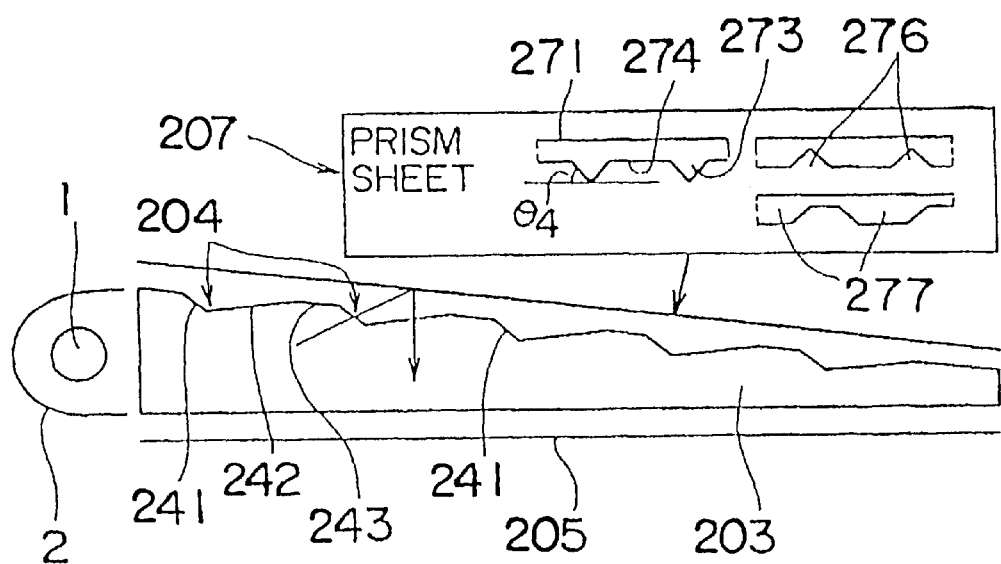
FIG. 33 is a more detailed cross-sectional schematic view of the illuminating system by overhead irradiation in the fourth embodiment.

In FIGS. 24 and 33, reference numeral 207 denotes a transparent plate (hereinafter, referred to as prism sheet), which is made from a material such as quartz, glass, transparent resin like acrylic resin or polycarbonate, or the like. In particular, a transparent resin, when used, may be a soft material formed into a sheet shape.

Figure 25:
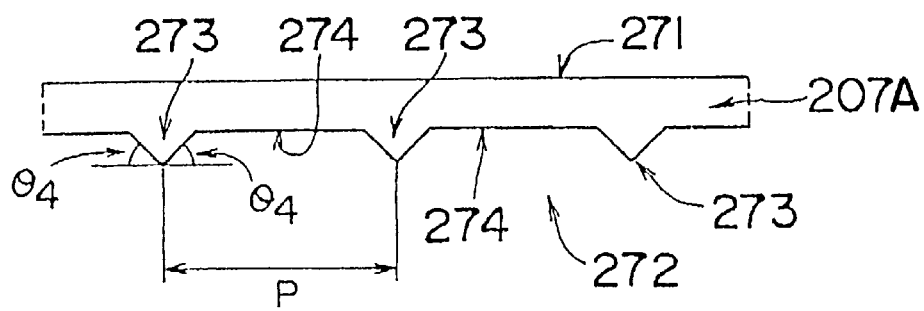
FIG. 25 is a cross-sectional schematic view of the prism sheet in the fourth embodiment.

One side of a prism sheet 207A the prism sheet 207 is a flat surface 271, and the other side is a prism surface 272 with the cross section formed into a triangular, wedge shape. The shape of the prism sheet 207 is generally equal in size to the light guide member 203, as viewed from the top. On the prism surface 272 of the first prism sheet 207A, are arrayed a plurality of combinations of at least an isosceles triangular (or equilateral triangular, possible) wedge-shaped projected portion 273 (hereinafter, referred to as prism portion) and a flat portion 274 as shown in FIG. 25, where the wedge-shaped projected portions 273 with an isosceles-triangular cross section each extend parallel to the longitudinal direction of the light source 1 and are arranged at the intervals of the pitch P in a direction perpendicular to the longitudinal direction. If the angle formed by each slope of the projected portions 273 with an isosceles-triangular cross section and an imaginary plane parallel to the flat surface 271 is $\theta_4$, then $\theta_4$ is preferably set within a range of 30° to 50° in order that the first prism sheet 207A effectively works. The prism sheet 207 is placed on the top face of the light guide member 203 with the, prism surface 272 downside.

Next, operation of the illuminating system in the fourth embodiment is described.

Figure 26:
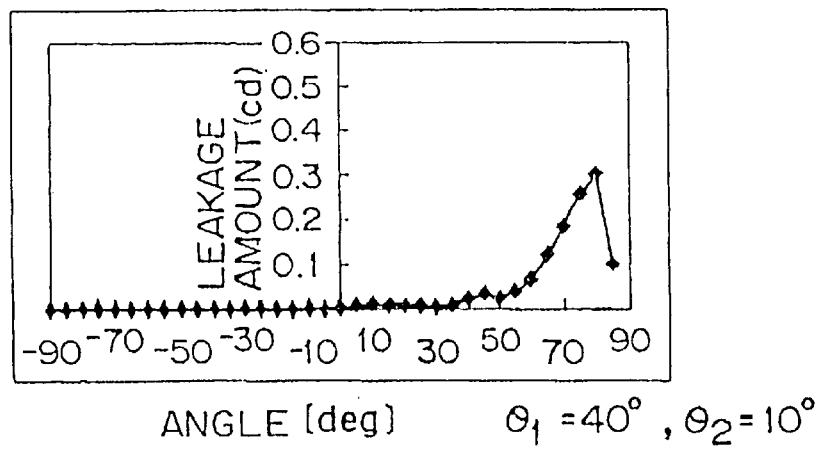
FIG. 26 is a graph showing the radiation distribution of light outputted from the top face of the light-guide member in the fourth embodiment.
Figure 27:
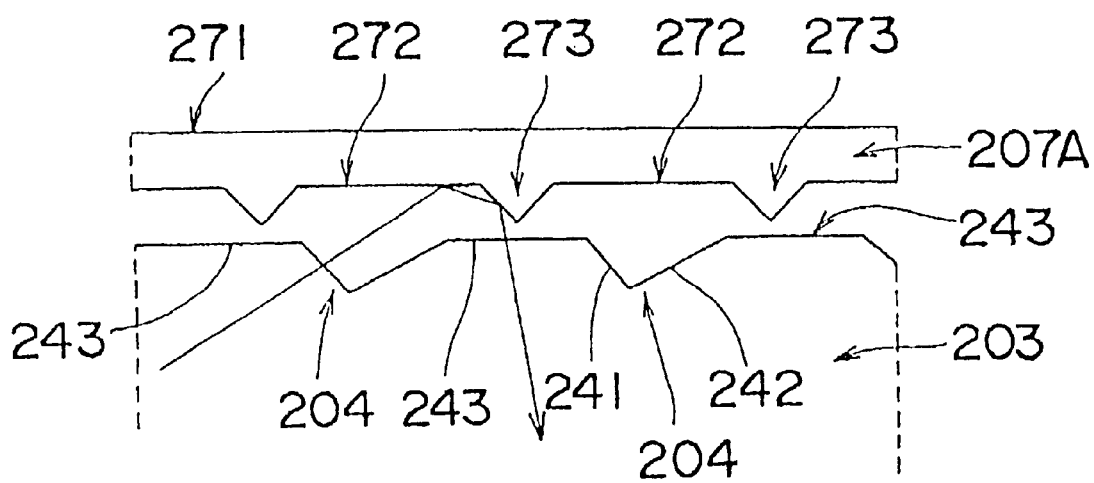
FIG. 27 is a view for explaining the reflection of light at prism portions in the fourth embodiment.

Some of the light that has been incident on the light guide member 203 from the light source 1 is transmitted through the first slopes 241 of the grooves 204. This ray of light has a large outgoing angle with respect to the top face 231 of the light guide member 203. For example, the light is outputted in a direction in the vicinity of 800 in the foregoing third embodiment. FIG. 26 shows a graph of characteristics of light outputted from the light guide member top face 231 under the conditions of $\theta_1=40°$ and $\theta_2=10°$. In FIG. 26, it can be understood that the leakage amount of light becomes large at outgoing angles around 70°–80°. Accordingly, the light, upon reaching the prism surface 272 of the first prism sheet 207A, is reflected by the triangular projected portions 273 as illustrated in FIG. 27 so as to be incident again on the light guide member 203 and pass through the light guide member 203, thus reaching the reflecting plate 205. In this process, it was derived from experiments and simulations that slope angles $\theta_4$ within a range of 30° to 50° allow a good efficiency to be obtained. As a result of this, the light illuminating efficiency is improved so that the brightness is enhanced.

Also, the light (image) reflected by the reflecting plate 205 would yield distortion when passing through the light guide member 203 and the first prism sheet 207A. However, the cross section of the first prism sheet 207A having the flat portions 274, given a large length ratio of the flat portion 274 to the slope of the prism portions 273 and a small pitch P of the prism portions 273, then less distortion results. That is, when the prism portions 273 are provided at a pitch not more than the minimum resolution (dot pitch) of the reflecting plate, only the light transmittance of each dot affects the image quality and the distortion of each dot never affects the image quality.

Further, although not limited because of differences among applications, a length x of the slope, if not more than {Lx(0.5/60)xπ/180}, makes the prism-portion lines inconspicuous on the ground that the human eye's minimum resolution is 0.5 minute, where L is the distance at which usually the screen is viewed. For example, if L is 35 cm, then prism-portion lines of not more than 50 μm can be said to be inconspicuous.

Thus, it is preferable that the pitch p of the prism portions 273 is not more than the dot pitch of the reflecting plate or that the length of the slope of the prism portions 273 is not more than {Lx(0.5/60)xπ/180}, where L is the distance at which the observer usually views the screen (the distance between the observer and the top face of the prism sheet), in which case the lines of the projected portions 273 are inconspicuous.

Figure 28A:
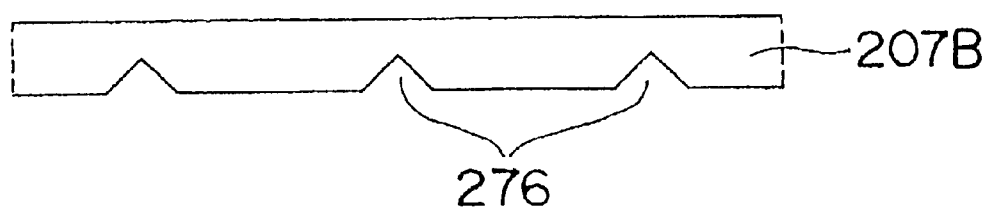
FIGS. 28A, 28B are cross-sectional schematic views showing another example of prism sheet in the fourth embodiment.
Figure 28B:
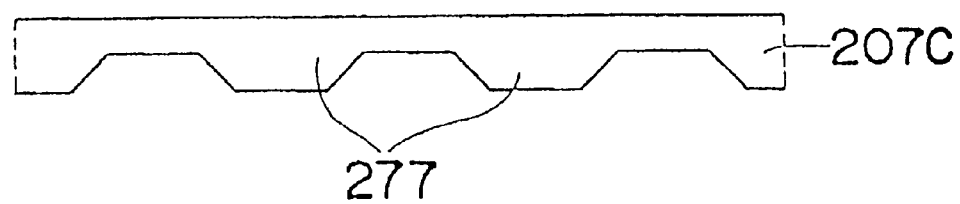

As concrete examples of numerical values, the angle $\theta_4$ of the slope is set to within a range of 30° to 50° for recycling of leakage light, while the pitch p is set to not more than 250 μm so as to be not more than the dot pitch of the reflecting plate 205, for reduction in the prism-portion lines. Further, the length of the slope of the prism portions is set to not more than 50.9 μm so as to be not more than {Lx(0.5/60)xπ/180}, for reduction of the prism-portion lines, The first prism sheet 207A, which is intended to recycle the light that has leaked from the light guide member 203 by reflecting it at the slopes, may be implemented in other shapes only if slopes and a flat portion similar to those of the above embodiment are provided. FIGS. 28A and 28B show examples of other shapes of second and third prism sheets 207B and 207C of the prism sheet 207. For example, the prism sheet 207B can be implemented by one arrangement in which a plurality of grooves 276 each having a triangular cross section are arranged as shown in FIG. 28A, or another prism sheet 207B in which a plurality of hills 277 each having a trapezoidal cross section are arranged as shown in FIG. 28B, or the like (see FIG. 33).

Further, the radiation distribution of light emitted from the light source 1 has a spread in not only the vertical direction but also horizontal direction to the light source. Therefore, by placing the prism sheet 207 in such a direction of the prism that the projected portions or the like extend in a direction perpendicular to the longitudinal direction of the light source 1, component rays of light in the direction horizontal to the light source 1 are reflected by the slopes so as to pass again through the light guide member 203 and illuminate the reflecting plate 205, by which the illuminating efficiency can be improved.

Therefore, according to the fourth embodiment, light emitted from the light source 1 becomes incident on the light guide member 203, and propagates on and on while being iteratively totally reflected within the light guide member 203. During this process, the light is totally reflected by the grooves 204, . . . , 204 provided in the top face 231 of the light guide member 203, being changed into an angle of light smaller than the total reflection angle and so outputted to the bottom face side, thus illuminating the illumination object 205. The reflection at the grooves 204 is composite reflection at the first slope 241, the second slope 242 and the flat portion 243. Therefore, part of the light is outputted from the top face 231 of the light guide member 203 by the first slopes 241. The light outputted from the light guide member top face 231 is reflected by the slopes of the bottom face of the prism sheet 207 so as to be incident again on the light guide member 203, thus illuminating the illumination object 205. Thus, the illuminating efficiency is improved.

Also, since the angle $\theta_4$ of the slopes of the prism sheet 207 is within the range of 30° to 50°, a more efficient illumination can be achieved.

Also, if the pitch P of the slopes of the prism sheet 207 is not more than the dot pitch of the illumination object 205, the lines of the prism sheet 207 become inconspicuous so as not to be an obstacle to the observer 206.

Further, if the length of the slope is not more than $\{Lx(0.5/60)x\pi/180\}$, where L is the distance between the observer 206 and the top face 271 of the prism sheet 207, then the prism-portion lines become inconspicuous so as not to be an obstacle to the observer 206 on the ground that the human eye's resolution is 0.5 minute. Thus, there can be provided the illuminating system by overhead irradiation which is simple in construction, good at illuminating efficiency and inconspicuous in prism-portion lines, Next, an illuminating system by overhead irradiation according to a fifth embodiment of the present invention is described.

The illuminating system of the fifth embodiment of the invention is generally similar in construction to the illuminating system of the fourth embodiment, and differs therefrom only in the way how the prism sheet is positioned. The prism sheet 207 in this embodiment is positioned with the prism surface 272 upside.

Figure 34:
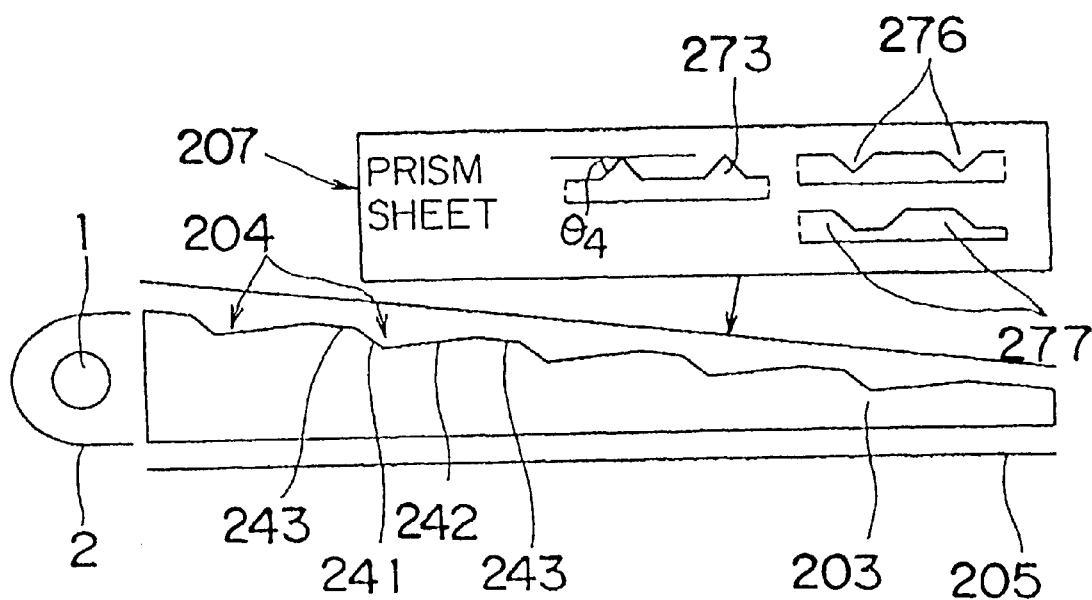
FIG. 34 is a more detailed cross-sectional schematic view of the illuminating system by overhead irradiation in the fourth embodiment.

The operation in this case is described with reference to FIGS. 29 and 34. Reflected light, although varying depending on the characteristics of the reflecting plate 205, is generally diffused light. On this account, the light is radiated also in directions out of the angle of visibility. This light out of the angle of visibility is condensed by the prism surface 272 of the prism sheet 207, by which the front brightness is improved.

Assume that the reflected light is distributed around a center of a direction generally vertical to the light guide member 203 and the prism sheet 207 (the center direction is here assumed to be 0°). The reflected light passes through the light guide member 203 so as to, be incident on a flat portion 274 of the prism sheet 207. Assuming that the reflecting plate 205 is a complete diffusing plate, the light after being incident on the prism sheet 207 is distributed to $\pm\sin^{-1}(1/n_1)$ around the 0° direction, where $n_1$ is the refractive index of the prism sheet 207.

Figure 29:
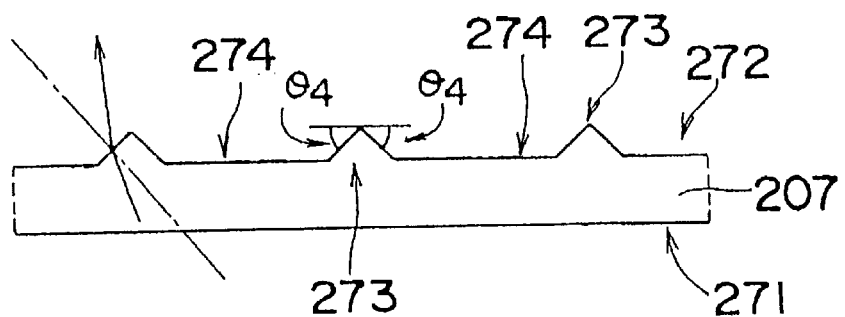
FIG. 29 is a view for explaining the propagation of light within the prism sheet in the fifth embodiment.

As shown in FIG. 29, if the angle formed by the flat surface 271 and the slope of the prism portions 273 of the prism sheet 207 is $\theta_4$, then the outgoing angle is $\{\theta_4+\sin^{-1}(n\times\sin(\alpha-\theta_4))\}$. Given a $\theta_4$ of 50° and $n_1$=1.5, the maximum value of $\alpha$, $+\sin^{-1}(1/n_1)$, is 41.8°, the outgoing angle being 37.7°, which is smaller than ±90°, an angle before the incidence on the prism sheet. On this account, the radiation distribution of the reflected light is narrowed by the slopes of the prism sheet 207. It was derived from experiments and simulations that slope angles $\theta_4$ within a range of 30° to 50° allow a good efficiency to be obtained. That is, with the slope angle in this range, the radiation angle distribute of reflected light can be narrowed so that the front brightness is enhanced.

As shown above, by positioning the prism surface 272 upside, the front brightness can be improved.

Also, the reflecting plate 205 may be other than a complete diffusing surface or other the outgoing angle of the light guide member 203 may be other than 0°, in which case also the radiation distribution can be narrowed in a similar manner, preferably.

Also, the light (image) reflected by the reflecting plate 204 would yield distortion when passing through the light guide member 203 and the prism sheet 207. However, the cross section of the prism sheet 207 having the flat portions 274, given a large length ratio of the flat portion 274 to the slope portion of the prism portions 273 and a small pitch of the prism portions 273, then less distortion results. That is, when the grooves are provided at a pitch not more than the minimum resolution (dot pitch) of the reflecting plate, only the light transmittance of each dot affects the image quality and the distortion of each dot never affects the image quality.

Further, although not limited because of differences among applications, a length x of the slope, if not more than $\{Lx(0.5/60)x\pi/180\}$, makes the prism-portion lines inconspicuous on the ground that the human eye's minimum resolution is 0.5 minute, where L is the distance at which usually the screen is viewed. For example, if L is 35 cm, then prism-portion lines of not more than 50 $\mu$m can be said to be inconspicuous.

Thus, it is preferable that the pitch P is not more than the dot pitch of the reflecting plate or that the length of the slope is not more than $\{Lx(0.5/60)x\pi/180\}$, where L is the distance at which the observer usually views the screen, in which case the prism-portion lines are inconspicuous.

Examples of concrete numerical values are the same as in the fourth embodiment

In this fifth embodiment, the prism sheet 207, which is intended to improve the front brightness by condensing the light out of the angle of visibility by the prism surface 272 of the prism sheet 207, may be implemented in other shapes only if slopes and flat portions similar to those of the fifth embodiment are provided. FIG. 34 shows an example of other shapes. For example, out of the three kinds of prism sheets 207 in FIG. 34, a prism sheet on the left side is the prism sheet 207 of FIG. 29, while a prism sheet on the upper right side is one in which a plurality of grooves 276 each having a triangular cross section are arranged in its top face. A prism sheet on the lower right side is one in which a plurality of hills 277 each having a trapezoidal cross section are arranged in its top face. With these prism sheets, similar functions can be accomplished.

Also, as can be easily understood from the above description, the longitudinal direction of the prism of the prism sheet 207 is not limited.

Therefore, according to the fifth embodiment, by arranging on the light guide member 203 a prism sheet 207 comprising a transparent plate in which, with respect to a cross-sectional shape, a plurality of projected portions 273 having slopes of an angle $\theta_4$ to the bottom face are arranged on the top face so that a flat portion (274) generally parallel to the top face is interposed therebetween. Thus, the radiation distribution of reflected light from the illumination object 205 can be narrowed so that the front brightness can be improved.

Also, if the pitch p of the slope of the prism sheet 207 is not more than the dot pitch of the illumination object 205, the lines of the prism sheet 207 are inconspicuous so as not to be an obstacle to the observer 206.

Also, if the length of the slope is not more than $\{Lx(0.5/60)x\pi/180\}$, where L is the distance between the observer 206 and the top face of the prism sheet 207, the groove lines become inconspicuous so as not to be an obstacle to the observer 206 on the ground that the human eye's resolution is 0.5 minute. Thus, there can be provided the illuminating system by overhead irradiation which is simple in construction, good at illuminating efficiency and inconspicuous in groove lines.

Next, an illuminating system by overhead irradiation according to a sixth embodiment of the present invention is described with reference to the accompanying drawings. The illuminating system of the sixth embodiment of the invention is generally similar in construction to the illuminating system of the third embodiment, and differs therefrom only in the shape of the grooves of the light guide member 203.

Figure 30:
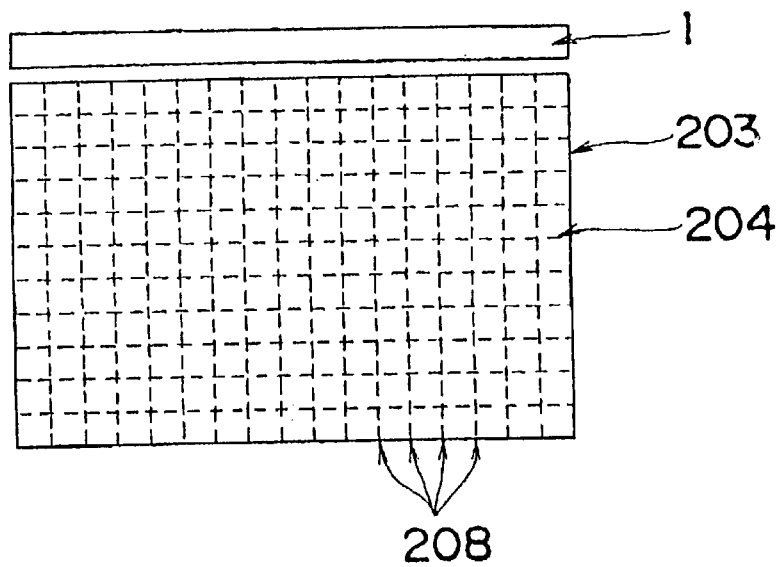
FIG. 30 is a view of an illuminating system by overhead irradiation in a sixth embodiment of the present invention, as viewed from the top.
Figure 31:
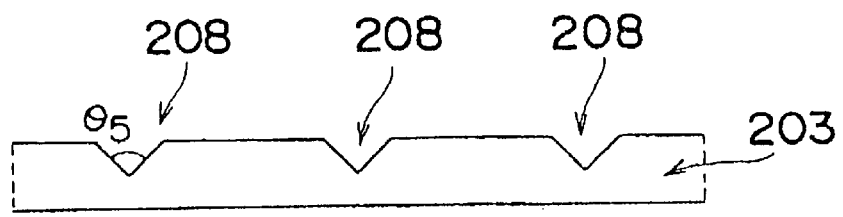
FIG. 31 is a cross-sectional schematic view of the light guide member in the sixth embodiment.

FIG. 30 shows a view from above the illuminating system. Lateral grooves 204 are provided along a direction parallel to the light source 1. Besides, longitudinal grooves 208 are provided along a direction perpendicular to the light source 1. The lateral grooves 204 are the same as the grooves 204 of the third embodiment. FIG. 31 shows a cross-sectional view of the longitudinal grooves 208. The longitudinal grooves 208 are V-shaped grooves and an apex angle $\theta_5$ of each groove 208 is between 80° to 120°.

The radiation distribution of light emitted from the light source 1 has a spread in not only the vertical direction but also horizontal direction to the light source 1. Therefore, by placing the longitudinal grooves 208, component rays of light in the direction horizontal to the light source 1 are reflected by the slopes so as to go out from the light guide member 203 and illuminate the reflecting plate 205, by which the illuminating efficiency can be improved. The present inventors made repeated experiments and simulations, finding out that angles $\theta_5$ within a range of 80° to 120° are effective. That is, with the angle $\theta_5$ in this range, the brightness can be improved by effectively utilizing the light in the direction parallel to the light source 1.

Examples of concrete numerical values for the pitch and the slope length are the same as in the fourth embodiment.

Therefore, according to the sixth embodiment, light emitted from the light source 1 becomes incident on the light guide member 203, and propagates on and on while being iteratively totally reflected within the light guide member 203. During this process, the light is totally reflected by the grooves 204, . . . , 204 provided in the top face 231 of the light guide member 203, being changed into an angle of light smaller than the total reflection angle and so outputted to the bottom face side, thus illuminating the illumination object 205.

The radiation distribution of light emitted from the light source 1 has a spread in not only the vertical direction but also horizontal direction to the light source 1. Therefore, by placing the longitudinal grooves 208, . . . , 208, component rays of light in the direction horizontal to the light source 1 are reflected by the slopes so as to go out from the light guide member 203 and illuminate the reflecting surface, by which the illuminating efficiency can be improved.

Also, since each longitudinal groove 208 is formed into a V-shape and the apex angle $\theta_5$ of each longitudinal groove 208 falls within the range of 80° to 120°, a highly efficient illumination can be achieved.

Thus, there can be provided the illuminating system by overhead irradiation which is simple in construction, good at illuminating efficiency and inconspicuous in groove lines.

As described above, according to one aspect of the present invention, the illuminating system by overhead irradiation at least comprises a light source, a transparent plate-shaped light guide member, at the side face of which the light source is located, in which a plurality of grooves are arranged in a top face of the light guide member at specified intervals in a direction parallel to a longitudinal direction of the light source, and in which flat portions constituting a part of the top face are arranged between adjacent ones of the grooves, wherein an illumination object placed on a bottom face side of the light guide member is observed from a top face side of the light guide member. Therefore, most of light propagating within the light guide member can be totally reflected by the grooves so as to go out from the light guide member, thereby illuminating the reflecting surface.

Also, by setting the angle of the first slope of the grooves so that $\theta_1 \leq 90 - \theta_c + 2\theta_3$, a more efficient illumination ran be achieved. Also, by setting the angle $\theta_1$ of the first slope so that $\theta_1 \approx 45° + \theta_3 - (1/2)\sin^{-1}(1/n \times \sin\beta)$, the outgoing angle can be aligned along the observer's direction $\beta$, favorably.

Also, setting the angle of the second slope of the grooves so that $\theta_2 \leq (1/2)\sin^{-1}(1/n)$, a more efficient illumination can be achieved.

Also, setting the pitch of the grooves to not more than the dot pitch of the illumination object, the groove lines can be made inconspicuous.

Also, setting the length of the first slope to not more than $\{L \times (0.5/60) \times \pi/180\}$, where L is the distance between the observer and the illuminating system, more specifically, the top face of the light guide member, the groove lines can be more inconspicuous.

According to the illuminating system by overhead irradiation in another aspect of the present invention, a transparent prism sheet is placed on the light guide member, the prism sheet having, with respect to a cross-sectional shape, a plurality of projected portions having slopes of an angle $\theta_4$ to the top face which are arranged on the bottom face so that a flat portion generally parallel to the bottom face is interposed therebetween. Therefore, the light that has leaked from the light guide member can be reflected by the slopes of the angle $\theta_4$ so as to pass through the light guide member, thereby illuminating the reflecting plate.

Also, by setting the slope angle $\theta_4$ to within a range of 30° to 50°, the illuminating efficiency is more improved.

Also, by setting the pitch of the slope of the prism sheet to not more than the dot pitch of the illumination object, the groove lines can be made inconspicuous.

Also, by setting the length of the slope of the prism sheet to not more than $\{L \times (0.5/60) \times \pi/180\}$, where L is the distance between the observer and the illuminating system, the groove lines can be more inconspicuous.

According to the illuminating system by overhead irradiation in still another aspect of the present invention, a transparent prism sheet is placed on the light guide member, the prism sheet having, with respect to a cross-sectional shape, a plurality of projected portions having slopes of an angle $\theta_4$ to the bottom face which are arranged on the top face so that a flat portion generally parallel to the top face is interposed therebetween. Thus, the radiation distribution of reflected light from the reflecting surface pan be narrowed, by which the front brightness can be improved.

Also, by setting the pitch of the slopes of the prism sheet to not more than the dot pitch of the illumination object, the groove lines can be made inconspicuous.

Also, by setting the length of the slope to not more than $\{L \times (0.5/60) \times \pi/180\}$, where L is the distance between the observer and the illuminating system, more specifically, the top face of the prism sheet, the groove lines can be made more inconspicuous.

Further, according to the illuminating system by overhead irradiation in yet another aspect of the present invention, a plurality of grooves are arranged in the top face of the light guide member at specified intervals in a direction perpendicular to a longitudinal direction of the light source. Therefore, component rays of light in the direction horizontal to the light source can be reflected by the slopes so as to go out from the light guide member and illuminate the reflecting surface. Thus, the illuminating efficiency can be improved.

Also, by setting the perpendicularly provided grooves into a V-shape, and by setting the apex angle or of the V-shape to within a range of 80° to 120°, the illuminating efficiency can be further improved.

Further, with the liquid crystal display using any one of the illuminating systems as described above, a liquid crystal display which can succeed the advantages of the above illuminating systems can be achieved.

An illuminating system according to a seventh embodiment of the present invention will be described with reference to FIGS. 36, 37.

Figure 36:
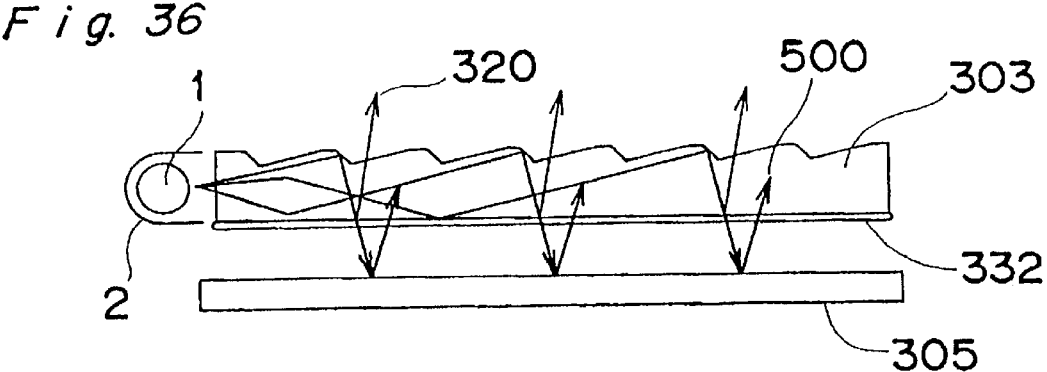
FIG. 36 is a schematically sectional view of an illuminating system according to a seventh embodiment of the present invention.
Figure 37:
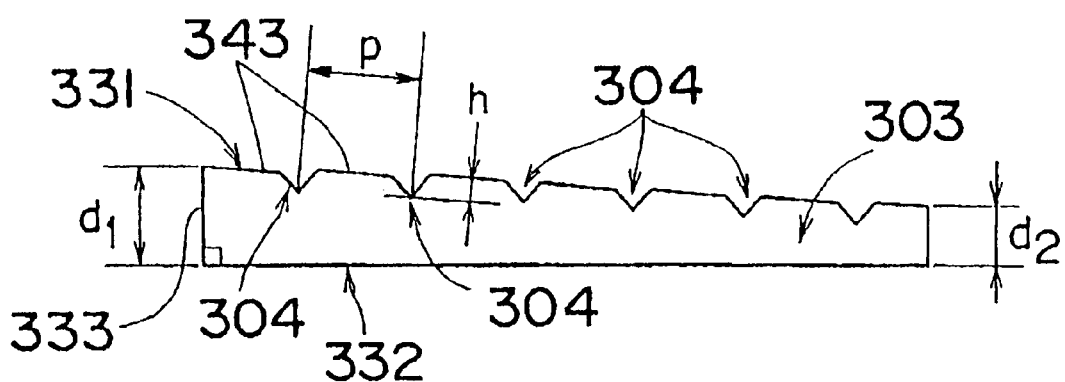
FIG. 37 is a schematically sectional view of a transparent plate of the seventh embodiment of the present invention.

FIG. 36 is a diagram in cross section of the illuminating system using an example of a light guide member in the seventh embodiment of the present invention.

In FIG. 36, reference numeral 11 denotes a light source which is, for example, a fluorescent lamp such as a hot cathode ray tube or cold cathode ray tube, or an array of a plurality of light emitting diodes, or an incandescent lamp or a linearly shaped organic light emitting material, etc. The light source 1 is arranged at a side face of a light guide member 303 of a transparent plate.

Reference numeral 2 denotes a reflector in FIG. 36 which is arranged to cover the light source 1. The reflector 2 is constituted so that an inner face shows high reflectance and small diffusion performance. For instance, silver, aluminum or the like material of high reflectance is vapor-deposited to a resin sheet, which is then bonded to a thin metallic plate or resin sheet, thereby to constitute the reflector. If the light source 1 is a fluorescent lamp, a gap between the light source 1 and reflector 2 is preferably filled with a material having a refractive index close to that of glass, namely, 1.5.

Preferably, a thickness of the side face of the light guide member 303 at the side of the light source 1 is equal to a height of the reflector 2. When the light source 1 is composed of light emitting diodes, the reflector 2 can be eliminated because a radial distribution of the, light source has some level of directivity. In that case, the light guide member 303 is desirably compact in size.

Still referring to FIG. 36, the light guide member 303 is, e.g., a transparent plate (referred to simply as a "light guide member" hereinbelow) formed of quartz, glass, or transparent resin such as acrylic resin, polycarbonate, etc. The light guide member 303 is made in the same size as that of an illumination object. As shown in FIG. 37, a lower face 332 of the light guide member 303 is set to be approximately 90° to a plane of incidence 333. The light guide member 303 is schematically shaped like a wedge as a whole, having an upper face 331 tilted so as to be gradually closer to the lower face 332 with increasing distance from the light source 1. More specifically, supposing that the thickness of the side face 333 of the light guide member 303 at the side of the light source is d1, and a thickness of a side face of the light guide member at the side opposite to the light source 1 is d2, $d1 \geq d2$ is held. Although d1=d2 is fundamentally satisfactory, a relation of the thicknesses of d1>d2 is more preferable to maintain a luminance constant. A plurality of V-shaped grooves 304 are notched in the upper face 331 of the light guide member 303.

In FIG. 36, reference numeral 305 denotes a reflecting face which is, for example, a printed article such as a book, a photograph or the like, an image display device of a personal computer or other Office Automation equipment, a portable information terminal, a portable video tape recorders, etc., or a reflecting type liquid crystal display device used in various kinds of monitors.

The propagation of light in the illuminating system of the seventh embodiment will now be described.

Light projected from the light source 1 enters the light guide member 303 directly or after being reflected at the reflector 2. The light entering the light guide member 303 is totally reflected and propagates. The light reflected at the grooves 304 among the propagation light loses total reflection conditions and consequently comes out from the lower face 332 of the light guide member.

At this time, the light is reflected at the lower face 332 of the light guide member to be a reflected light 320. The light projected from the lower face 332 of the light guide member illuminates the reflecting face 305, when the light is reflected at the reflecting face 305 and becomes a reflected light 500. The reflected light 500 is an image generated by the reflecting face 305. The reflected light 320 is an unnecessary light worsening visibility of the image.

Meanwhile, in the seventh embodiment, the lower face 332 of the light guide member is subjected to an anti-reflection treatment or a diffuse treatment by the known vacuum vapor deposition method, dip method, thermal transfer method, etc. When the lower face 332 is processed through the anti-reflection treatment, the total quantity of the reflected light from the lower face 332 designated by 320 in FIG. 36 is reduced so large as is negligible enough in comparison with the quantity of the reflected light 500 from the reflecting face 305. Therefore, visibility can be improved greatly.

When the lower face 332 is processed through the diffuse treatment, the reflected light 320 from the lower face 332 of the light guide member becomes irregularly reflected, whereby the quantity of light sensed as bright lines by human eyes due to the mirror reflection is reduced although the total quantity of the reflected light is unchanged, and the visibility can be improved.

However, the diffuse treatment to the lower face 332 causes the reflected light 500 from the reflecting face 305 to diffuse similarly, rather inviting blurring in outline of displayed characters, etc. and decreasing the visibility. For avoiding this inconvenience, a haze value of the diffuse treatment to the lower face 332 is preferably not larger than 20%, particularly in a range of 4–10% to reduce bright lines of the reflected light 320 in a well-proportioned relation to the outline blurring, as is detected from experiments with many people including women and aged people. The "haze value" referred to here is a numerical value indicating a degree of diffusion, i.e., a ratio expressed by % of a diffuse transmission light and a total transmission light.

Needless to say, the visibility can be naturally improved furthermore if both the anti-reflection treatment and the diffuse treatment are performed to the lower face 332 of the light guide member.

When an anti-reflection film is formed on the upper face 331 of the light guide member 303, the reflection by an external light can be also reduced, with the visibility improved more.

A reflection type liquid crystal display device using the light guide member according to the seventh embodiment of the present invention will be described with reference to FIG. 38.

Figure 38:
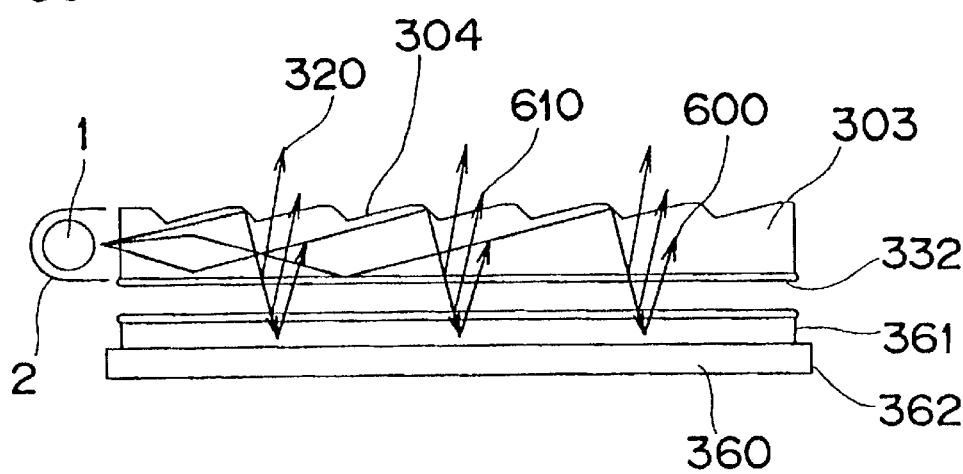
FIG. 38 is a schematically sectional view of a reflection type liquid crystal display device according to the seventh embodiment of the present invention.

Those parts of FIG. 38 denoted by the same numerals as in FIG. 36 represent the same parts. 360 is a reflection type liquid crystal panel comprised of two substrates 361 and 362. The lower face 332 of the light guide member 303 is subjected to the anti-reflection treatment or diffuse treatment in the known method, for example, vacuum vapor deposition, dipping, or thermal transfer method or the like. A surface of the substrate 361 of the reflection type liquid crystal panel 360 is also processed through the anti-reflection treatment or diffuse treatment.

Because of the anti-reflection treatment to the lower face 332 of the light guide member or the surface of the substrate 361, the total quantity of the reflected light 320 from the lower face 332 of the light guide member or the reflected light 610 from the surface of the substrate 361 is reduced to a negligible level as compared with the quantity of a reflected light 600 from the liquid crystal panel 360. The visibility can consequently be enhanced.

It goes without saying that the anti-reflection treatment may be executed to both of the lower face 332 of the light guide member and the surface of the substrate 361.

When the diffuse treatment is carried out to either the lower face 332 of the light guide member or the surface of the substrate 361, the reflected light 320 from the lower face 332 or the reflected light 610 from the surface of the substrate 361 is irregularly reflected. As a result, the amount of light detected as bright lines by human eyes due to the mirror reflection is reduced although the total amount of the reflected light is not changed, and accordingly the visibility can be improved.

In spite of the above effect, the reflected light 600 from the reflection type liquid crystal panel 360 is diffused likewise in consequence of the diffuse treatment, with bringing about an issue that displayed characters are blurred in outline and deteriorated in visibility. Therefore, the haze value of the diffuse treatment to the lower face 332 of the light guide member or the surface of the substrate 361 is preferably set to be 20% or lower. Results of experiments from many people including women and old people show that the haze value is particularly preferably 4–10% to keep an even balance between the reduction of bright lines by the reflected light 320 or 610 and the outline blurring.

In the case where the lower face 332 of the light guide member and the surface of the substrate 361 are both subjected to the diffuse treatment, the haze value of the diffuse treatment to the surface of the substrate 361 which is closer to the reflection type liquid crystal panel 360 is set larger than that to the lower face 332 of the light guide member separated farther from the liquid crystal panel 360, so that the visibility is controlled not to decrease, in other words, displayed characters are prevented from blurring in outline, etc.

The visibility can be improved much more if both the anti-reflection treatment and the diffuse treatment are carried out to the lower face 332 of the light guide member or the surface of the substrate 361.

Besides, when the anti-reflection film is formed on the upper face 331 of the light guide member 303, the reflection because of the external light can be lessened and the visibility can be improved.

A reflection type liquid crystal display device according to an eighth embodiment of the present invention will be discussed with reference to FIG. 39.

Figure 39:
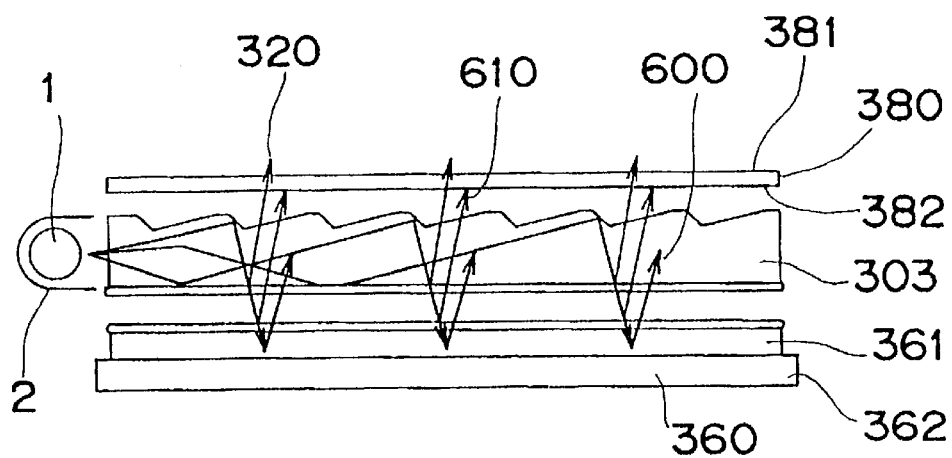
FIG. 39 is a schematically sectional view of a reflection type liquid crystal display device according to an eighth embodiment of the present invention.

Parts in FIG. 39 indicated by the same reference numerals as in FIG. 38 are the same parts. 380 is a touch panel used, for example, for inputting of information through touching via a pen or finger, etc. A front face 381 or a rear face 382 of the touch panel is processed through the diffuse treatment, thus diffusing the reflected light 320 from the lower face 332 of the light guide member and the reflected light 610 from the surface of the substrate 361. The amount of light sensed by human eyes as brightness is decreased and the visibility can be improved. In this arrangement alike, the haze value at the diffuse treatment is preferred to be set at 20% or lower in order to prevent the outline blurring of displayed characters. Especially when the touch panel is provided for the purpose of inputting information via a pen and if the haze value of the diffuse treatment to the front face 381 is larger than 10%, a write resistance is too large for the pen to run smoothly. On the other hand, if the haze value is smaller than 1%, the resistance is too small. As such, the haze value for the front face 381 is preferably 1–10%.

According to the display devices of the above-described seventh and eighth embodiments of the present invention, a transparent material is filled between the lower face 332 of the light guide member 303 and the reflection type liquid crystal panel 360 in the liquid crystal display device, which has approximately the same refractive index as that of a material of the light guide member 303 and that of the substrate 361 of the reflection type liquid crystal panel 360. Alternatively, a sheet of the above transparent material is interposed. The total quantity of the reflected light 320 and reflected light 610 is further decreased to the reflected light 600 from the liquid crystal panel 360. The visibility can accordingly be improved more.

Figure 40:
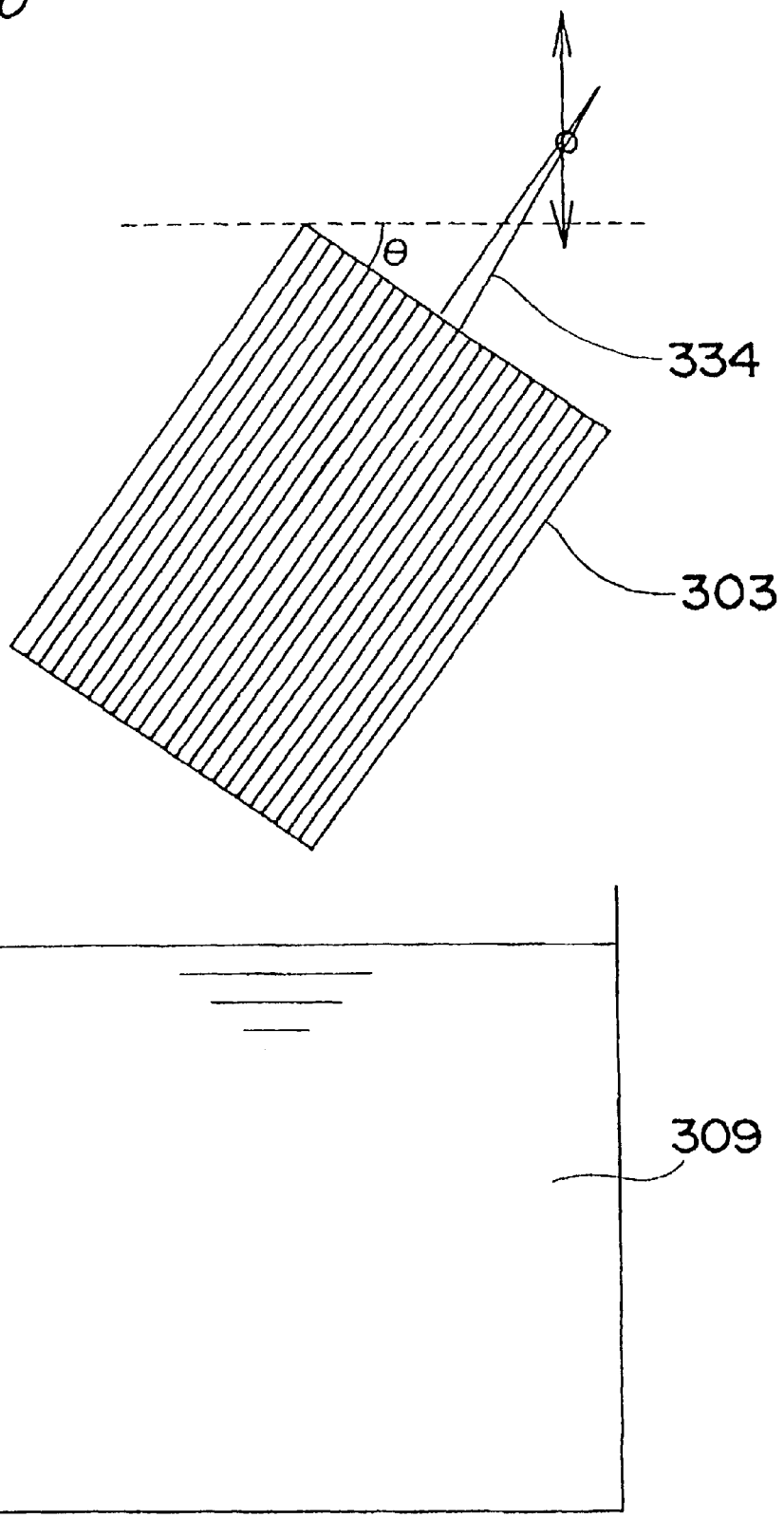
FIG. 40 is a diagram explanatory of the seventh embodiment of a method for manufacturing the transparent plate.
Figure 41:
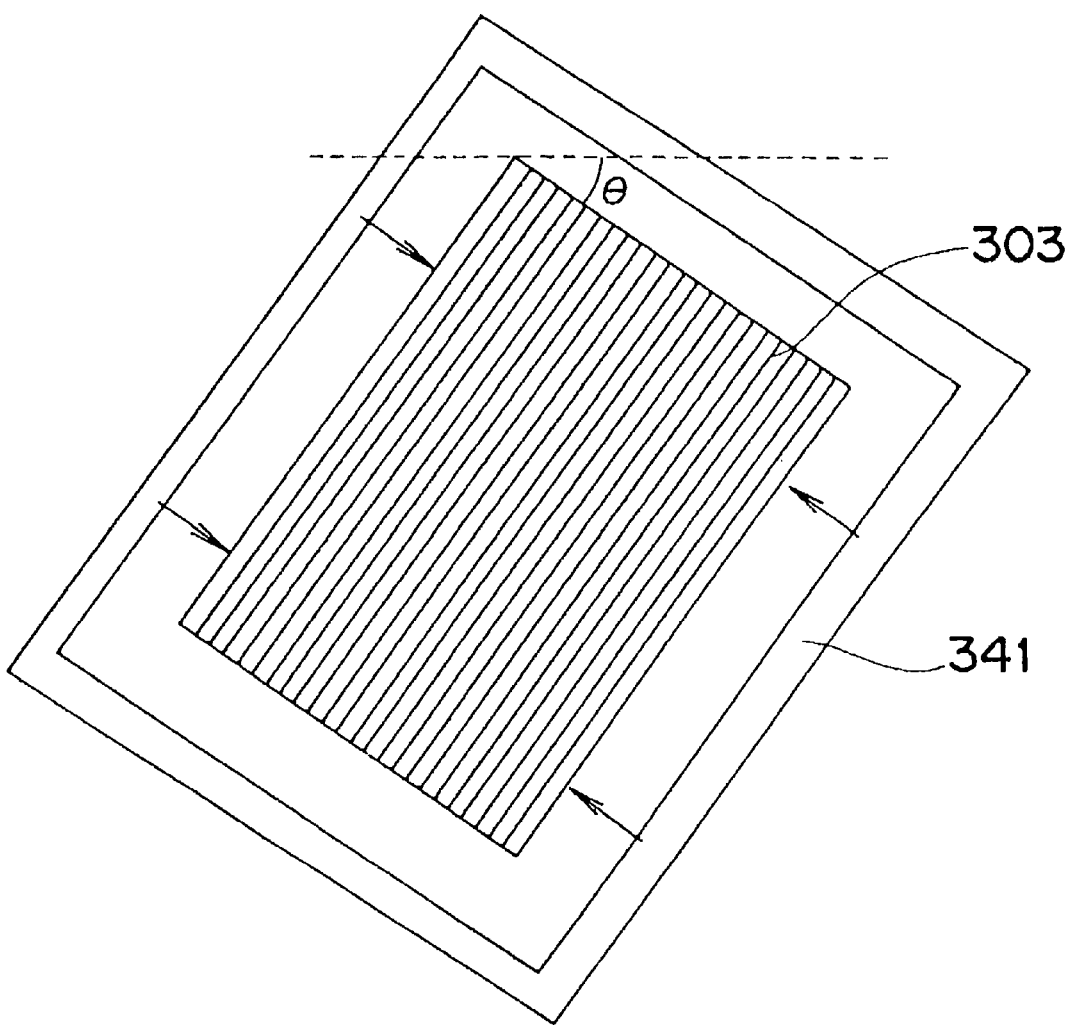
FIG. 41 is a diagram showing how the transparent plate is held in the manufacture method of FIG. 40.

A method for manufacturing the illuminating system according to a seventh embodiment of the present invention will be depicted with reference to FIGS. 40, 41.

The anti-reflection treatment is primarily carried out by one of three methods, namely, vacuum vapor deposition, spin coating and dip coating. Among the methods for the anti-reflection treatment, the dip coating is preferred to the light guide member 303, because the spin coating is difficult if the light guide member 303 includes grooves 304 and the vacuum vapor deposition method costs high. CYTOP by Asahi Glass, Co., Ltd. is employed by way of example as an anti-reflection agent in the dip coating.

The light guide member 303 is used as a front face of the display device, and therefore a uniform coat all over the face of the light guide member 303 is required. A drop of the agent liquid from an end face of the light guide member 303 can be eliminated if the light guide member 303 is inclined slantwise during the dip coating, as shown in FIG. 40. If the end face of the light guide member 303 is set in parallel to the liquid level without being inclined, the anti-reflection agent accumulated at the end face of the light guide member 303 drops after the dipping, resulting in an irregular coat to the light guide member 303.

In the case where the light guide member 303 is one formed by injection molding, the anti-reflection coating can be obtained all over the face of the light guide member 303 by holding a gate part 334 as illustrated in FIG. 40. In the absence of the gate part 334, the end face of the light guide member 303 is pressed from sideways to a direction of arrows as shown in FIG. 41, whereby the light guide member is fixed to an outer frame 341.

In the above-described manner, the anti-reflection coating can be formed uniformly all over the face of the light guide member 303 at low cost.

Although an inclination θ of the light guide member 303 is preferred to be large in order to prevent the agent from dropping, the larger the inclination θ is, the thicker the coating becomes at the grooves 304 of the upper face 331 than at the other parts. Therefore, the inclination is set as small as possible. The present invention found from repeated experiments that the inclination θ of 10°–30° surely presents the dropping of the agent and makes the thickness of the coating at the grooves 304 of the upper face 331 equal to that at the other parts. The anti-reflection coating agent in this case has a viscosity of approximately 10 cps and a pull-up speed of 80 mm/min.

The above range of the inclination θ differs depending on the viscosity and pull-up speed of the anti-reflection coating agent.

A reflection type liquid crystal display device in a ninth embodiment of the present invention using the light guide member will be described with reference to FIGS. 42, 43.

Figure 42:
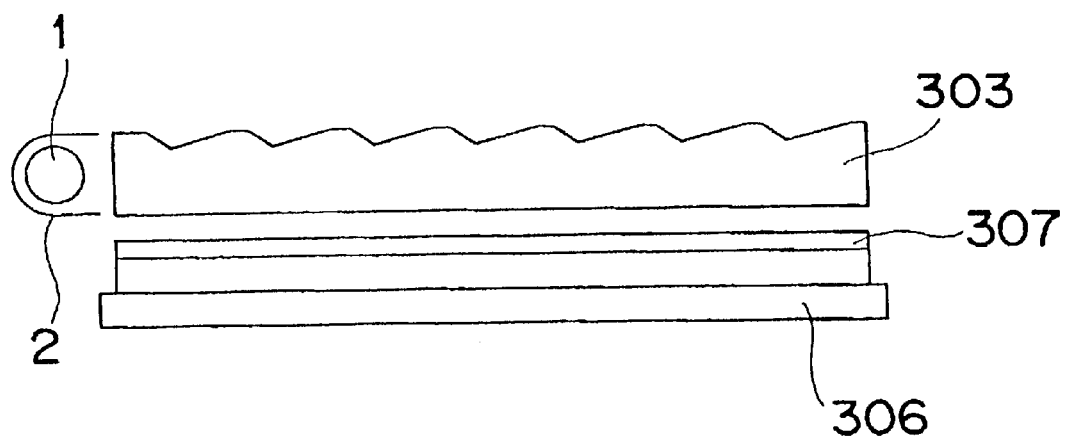
FIG. 42 is a schematically sectional view of a reflection type liquid crystal display device ninth embodiment of the present invention.

FIG. 42 is a schematical sectional view of the reflection type liquid crystal display device according to the ninth embodiment which is equipped with the illuminating system.

The display device of the ninth embodiment is almost the same in structure as the eighth embodiment. A difference is an angle of the light projected from the light guide member 303 and the presence of an field angle control sheet 307 disposed on the reflection type liquid crystal panel. In the ninth embodiment, the anti-reflection treatment and the diffuse treatment are not required to the light guide member and the reflection type liquid crystal panel.

The field angle control sheet 307 is a sheet which has a function to diffuse light from one direction and pass light from the other directions, for instance, "Lumisty" by Sumitomo Chemical Company, Limited, "Lower" by Minnesota Mining and Manufacturing Company etc. A diffusion direction θ of the field angle control sheet is not smaller than an angle of field to a normal direction of the display device, for example, 30° in the ninth embodiment.

Figure 43:
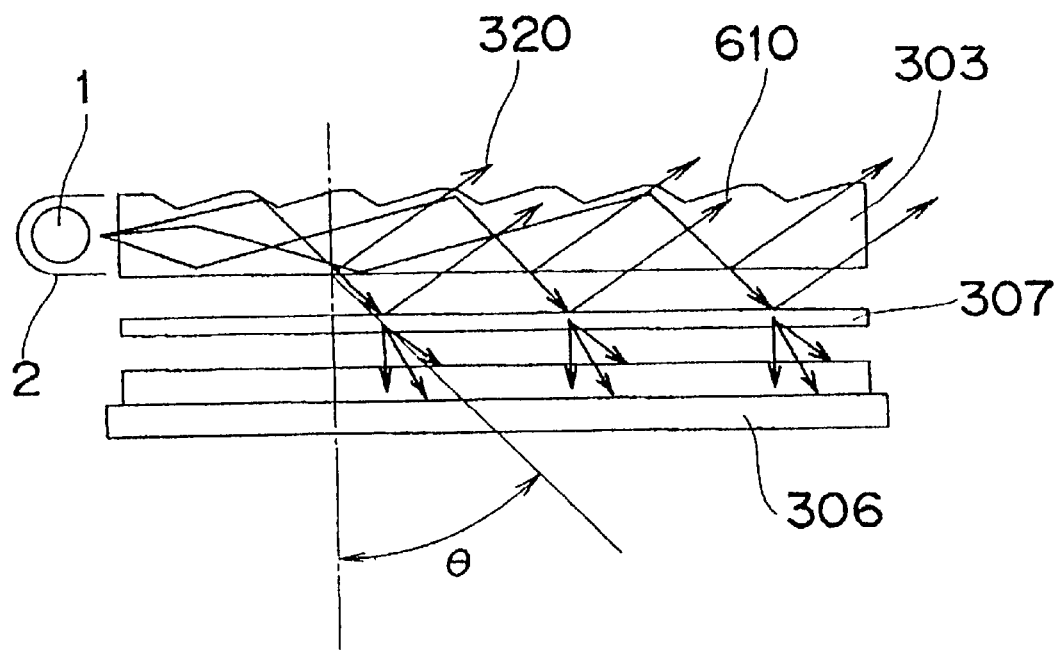
FIG. 43 is a diagram explanatory of the propagation.

FIG. 43 is an explanatory diagram of the propagation of light in the ninth embodiment.

Supposing that an output angle of the light guide member 303 is 30°, the unrequested reflected light 320 and also the unrequested reflected light 610 are directed outside the angle of visibility (field angle). Since the light projected from the light guide member 303 is turned to diffused light when passing through the control sheet 307, the light can Ulumminate the liquid crystal panel 306. Moreover, the originally necessary light reflected at the liquid crystal panel 306 is not diffused by the field angle control sheet 307. Therefore, blurring of characters does not take place and superior visibility is achieved.

Although the diffusion direction θ is set to be 30° in the ninth embodiment, the angle θ may be a different value other than 30°. However, if the angle θ is small, the unnecessary reflected lights 320 and 610 are projected into the angle of visibility, narrowing an easy-to-see angle of the display device. If the angle θ is large, the luminance in the normal direction of the display device is decreased. After conducting experiments by changing the angle θ from 0° to 70°, the Inventors detected that the easy-to-see angle is satisfied and the luminance in a direction of the front face is appropriate particularly when the angle is 30°–50°.

According to the light guide member of the seventh embodiment of the present invention as described hereinabove, the lower face of the light guide member is processed through the anti-reflection treatment or diffuse treatment, so that the total quantity of the reflected light from the lower face of the light guide member is greatly reduced, specifically as much as is negligible enough to the reflected light from the reflecting face. The visibility can accordingly be improved largely.

In the reflection type liquid crystal display device of the seventh embodiment using the light guide member, the reflection type liquid crystal panel is provided which has the surface of at least one substrate processed through the anti-reflection treatment or diffuse treatment. Moreover, the liquid crystal panel is disposed so that the surface subjected to at least one of the anti-reflection treatment and the diffuse treatment confronts the lower face of the light guide member. Accordingly, the reflected light from the lower face of the light guide member is reduced as much as is negligible in comparison with the reflected light from the surface of the liquid crystal panel, and the visibility can be improved greatly.

The touch panel processed through the anti-reflection treatment or diffuse treatment is arranged on the light guide member, thereby easing bright lines of the reflected light from the lower face of the light guide member and the surface of the substrate of the liquid crystal panel and improving the visibility eventually.

The haze value of the diffuse treatment to the surface of the substrate of the reflection type liquid crystal panel is set larger than that of the diffuse treatment to the lower face of the light guide member. Decrease in visibility such as outline blurring of displayed characters or the like can be hence restricted.

In the reflection type liquid crystal display device according to the eighth embodiment of the present invention using the light guide member, the transparent material of approximately the same, refractive index as that of the material of the light guide member and that of the substrate of the reflection type liquid crystal panel is filled into, or a sheet of the material is interposed between the lower face of the light guide member and the reflection type liquid crystal panel. Accordingly, the reflected light from the lower face of the light guide member and from the surface of the substrate of the reflection type liquid crystal panel is reduced to such a degree negligible as compared with the reflected light from the reflecting face of the liquid crystal panel, so that the visibility can greatly be improved.

According to the method for manufacturing the light guide member of the seventh embodiment, no drop of liquid is brought about from the end face of the light guide member. The anti-reflection treatment can be provided uniformly to the whole face of the light guide member.

The anti-reflection treatment can be carried out simply by holding the gate part of the light guide member.

According to the reflection type liquid crystal display device of the ninth embodiment using the light guide member, the field angle control plate (sheet) is arranged on the upper face of the reflection type liquid crystal panel. Since the angle of the illumination light projected from the lower face of the light guide member is nearly agreed with the diffusion direction of the field angle control plate, the light projected from the lower face of the light guide member is diffused, whereas the reflected light from the reflection type liquid crystal panel is not diffused, whereby the visibility can be improved.

Further, when each of the output angle of the light guide member and diffusion direction of the field angle control plate is 30°–50° to the normal direction of the liquid crystal panel, the reflected light from the lower face of the light guide member and from the substrate of the liquid crystal panel are sent outside the angle of visibility, so that the visibility can be improved.

The present invention can provide the light guide member easy to see, the reflection type liquid crystal display device using the light guide member and the manufacture method for the same.

Next, a tenth embodiment of the present invention will be described.

A back light is used by way of example as an illuminating system for a liquid crystal panel. The back light is, as is disclosed in Japanese Laid-Open Patent Publication No. 5-127159, constituted of a fluorescent lamp and a light guide member of a transparent flat plate, in which linear light from the fluorescent lamp is inputted to a side face of the light guide member and output as a linear light source to a liquid crystal panel with the utilization of the diffusion of light at silk printing provided at a rear face of the light guide member.

Lately, an illuminating system for illuminating the liquid crystal panel used in a portable information-processing device, consumes small power and operates at low voltage is required to achieve a compact, battery-driven structure with a long life. When the fluorescent lamp is used as the light source as in the above-mentioned back light, a high voltage generation circuit is necessitated to turn on the fluorescent lamp, and consequently, a loss at an electric circuit and a space for the electric circuit are to be taken into consideration. The light source using the fluorescent lamp is not fit to carry with.

On the other hand, a light-emitting diode which will be referred to as an "LED" hereinafter is the light source that can be driven by a battery. Many LEDs are arranged into an array and used as the linear light source to bring the light from the side face of the light guide member.

In the arrangement of LEDs as above, however, an intensity of light among the LEDs is decreased unless the LEDs are densely installed, varying a luminance distribution at the back light. Meanwhile, if the LEDs are arranged densely so as to eliminate the variation in luminance distribution, a count of LEDs used is increased, with hindering a cost reduction.

The tenth embodiment of the present invention provides a uniform linear light source, with solving the above-discussed inconveniences.

The linear light source according to the tenth embodiment of the present invention will be described with reference to FIGS. 44–49.

Figure 44:
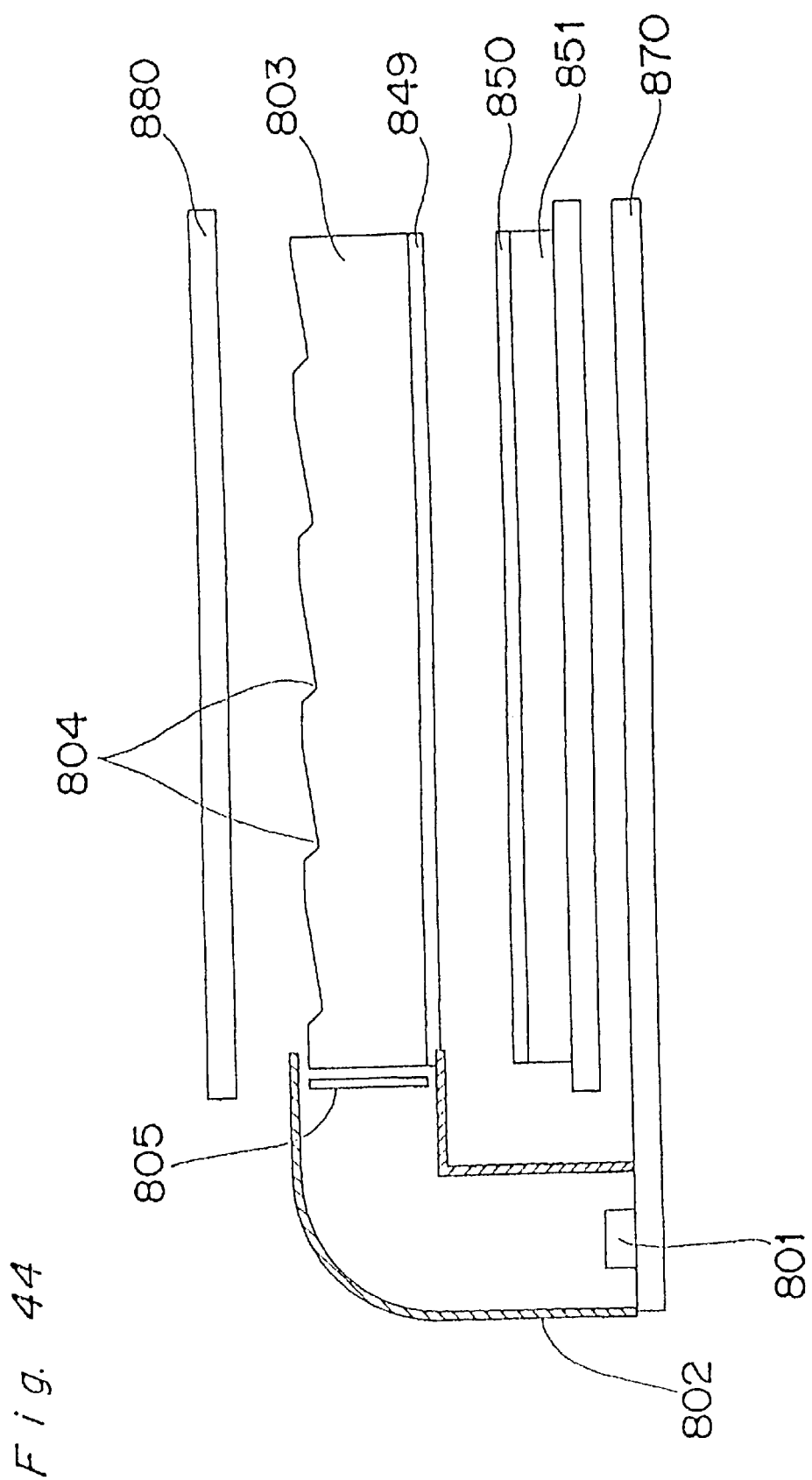
FIG. 44 is a schematically sectional view of an illuminating system of a tenth embodiment of the sent invention.
Figure 45:
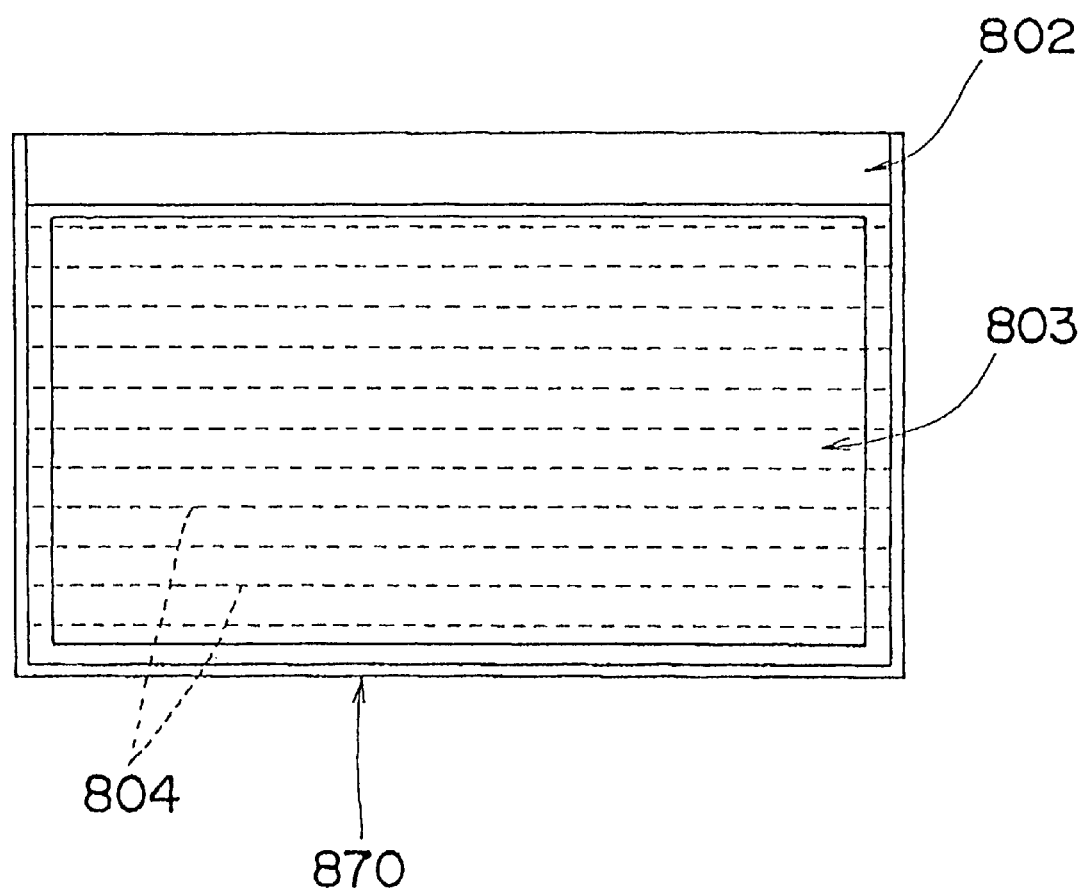
FIG. 45 is a plan view of the illuminating system of FIG. 44.
Figure 46:
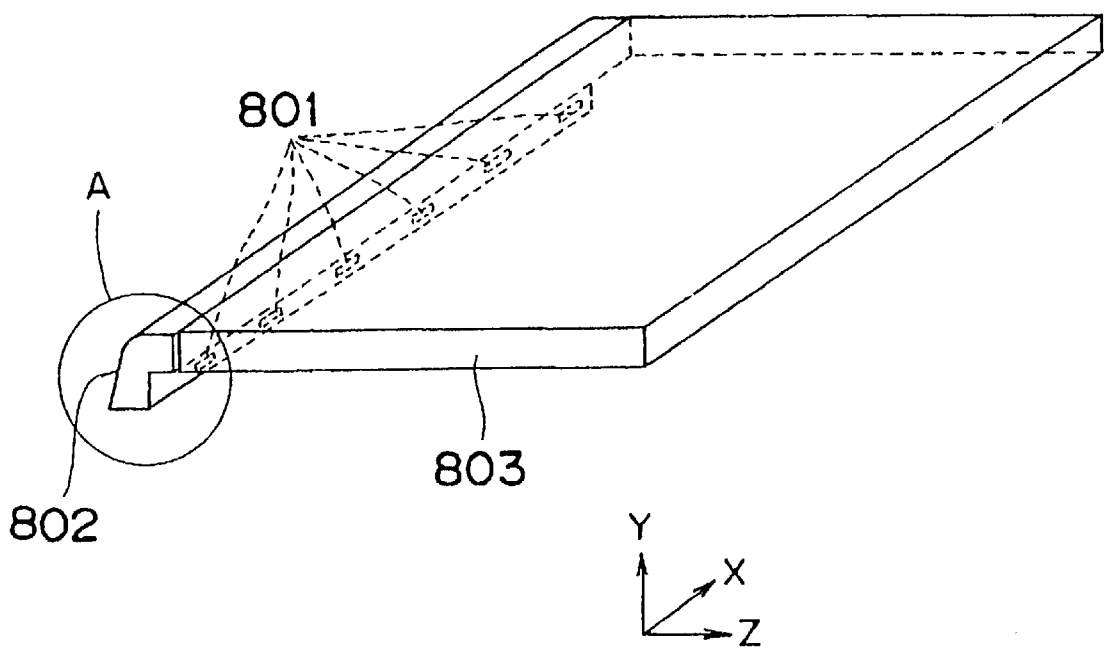
FIG. 46 is a perspective view of a light guide member and a reflecting plate of the illuminating system of FIG. 44.
Figure 47:
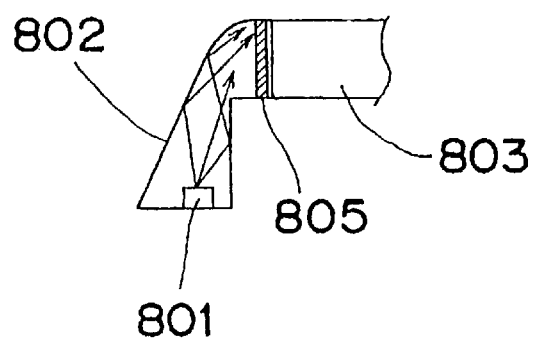
FIG. 47 is an enlarged view of a circular part of FIG. 46.

FIGS. 44, 46 are diagrams of the linear light source in the tenth embodiment. In FIGS. 44 and 46, 801 is a light source of a small light-emitting part, for instance, an LED or the like. The light sources 801 are arranged via a constant interval p. 805 is a diffusing plate. 802 is a reflecting plate disposed to cover the light sources 801 and diffusing plate 805. An inner face of the reflecting plate 802 is vapor-deposited with silver or aluminum, etc. to increase a reflectance. 803 is a light guide plate serving as one example of the light guide member, having the reflecting plate 802 set at a side face thereof to project light entering from the side face to an upper face or a lower face. 804 is the groove, 849 is an anti-reflection coating layer at the lower surface of the light guide plate 803. 851 is a liquid crystal panel, 850 is an anti-reflection and anti-plate coating layer at the upper surface of the panel 850. 870 is a circuit board on which the LEDs 801 are mounted. 880 is the touch panel of the eighth embodiment.

Supposing that a radial distribution of the light sources 801 is $f(\theta)$ and a distance between the light source 801 and diffusing plate 805 is L, the following expression is held;

$$L > p/(2\tan(\theta))$$

wherein $\theta$ is a value satisfying $f(\theta)\cos^2(\theta)=0.5$.

Figure 48:
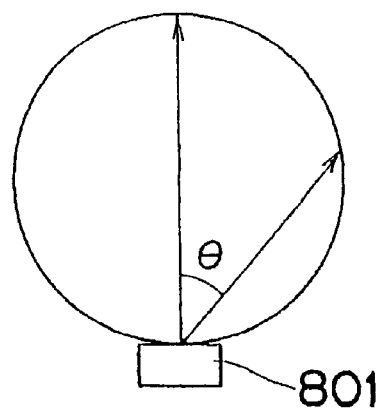
FIGS. 48 and 49 are explanatory views of distance selection between light sources and a diffusing plate of the system.
Figure 49:
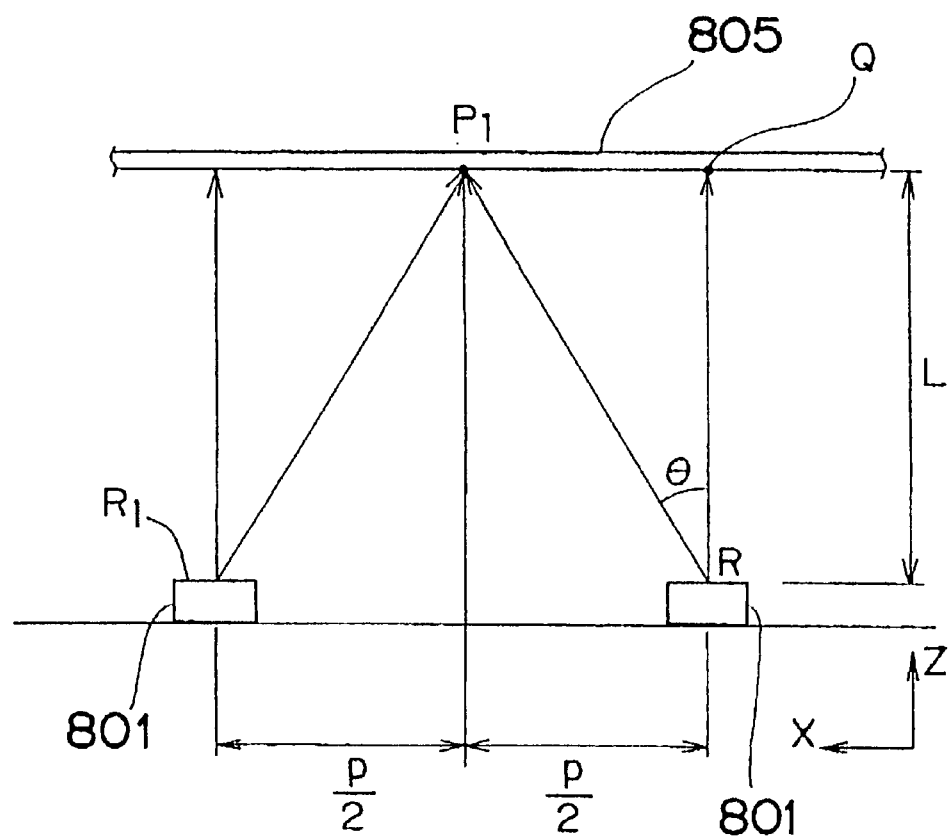

The linear light source 801 constituted as above achieves a uniform illumination, the reason for which will be discussed with reference to FIGS. 48 and 49. FIGS. 48 and 49 are XZ sectional views of the linear light source 801. The light sources 801 are arranged in an X direction via the constant interval p and separated from the diffusing plate 805 by the distance L. One light-emitting point of the light sources 801 is a point R. and an intersection of a line extending in a direction vertical to the point R, namely, in a Z direction and the diffusing plate 805 is a point Q. An intersection between a bisector of the point R and a light-emitting point $R_1$ next to the point R, and the diffusing plate 805 is a point $P_1$. A luminance in a direction inclined by $\theta$ in the Z direction at the point R is $f(\theta)$ where $(f(0)=1)$.

In order to make the light quantity from the light sources 801 uniform at the diffusing plate 805, although it is enough to sufficiently separate the light sources 801 from the diffusing plate 805, this makes the light source part bulky in size. For eliminating this problem, therefore, a minimum distance between the light sources 801 and diffusing plate 805 is calculated. Where the light quantity is smallest at the diffusing plate 805 is in the middle of light-emitting points R and $R_1$ of the light sources 801, i.e., point $P_1$. The distance L is selected so that the light quantity at the point $P_1$ becomes equal to that at the point Q, whereby the uniform linear light source is obtained.

The light reaching the point Q is mostly from the point $R_1$ and therefore the light quantity at the point Q is $1/L^2$. The quantity of light reaching the point $P_1$ is $2f(\theta)\cos^2\theta/L^2$. The $\theta$ is accordingly set to satisfy $f(\theta)\cos^2\theta=0.5$.

Thus, the distance L between the light sources 801 and diffusing plate 805 is determined to hold;

$$L > p/(2\tan(\theta))$$

For example, when the radial distribution $f(\theta)$ of the light-emitting points of the light sources 801 is equal to $\cos(\theta)$, $\theta$ is 37.5° because $\cos^3\theta=0.5$, and the distance L of the light source 801 and diffusing plate 805 becomes L>0.65 p.

As described hereinabove, when the light-emitting points of the light sources 801 are arranged via the pitch p and if the light sources 801 are separated from the diffusing plate 805 at least by $L>p(2\tan(\theta))$ wherein $f(\theta)$ is the radial distribution of the light-emitting points and $f(\theta)\cos^2\theta$ is equal to 0.5, the uniform linear light source is realized. Since the LED or the like light source that can be driven at low voltage is utilizable, the illumination is achieved in a compact and low-power structure to fit for use in a portable information device, etc.

According to the tenth embodiment of the present invention, the diffusing plate and the prism sheet of the light guide member are separated from the light sources by the distance L $(L>p/(2\tan(\theta)))$ wherein $f(\theta)$ is the radial distribution of light-emitting points and $f(\theta)\cos^2\theta$ is equal to 0.5. Accordingly, the linear illumination provided exerts high and uniform luminance.

The entire disclosure of Japanese Patent Applications No. 9-122343 filed on May 13, 1997, No. 9-224992 filed on Aug. 21, 1997, and No. 10-44960 filed on Feb. 26, 1998, including specifications, claims, drawings, and summaries are incorporated herein by reference in their entirety.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An illuminating system for illuminating an object by overhead light irradiation, said illuminating system comprising:

a light source; and a light guide member, wherein a plurality of grooves are provided on a top face of said light guide member at specified intervals and in a direction parallel to a longitudinal direction of said light source;

wherein each of said plurality of grooves provided on the top face of said light guide member is a V-shaped groove having a first slope of the groove located on a side closer to said light source and a second slope of the groove located on a side farther from said light source, and wherein an angle $\theta_2$ formed by the second slope and a bottom face of said light guide member satisfies a condition of $\theta_2 \leq (1/2)\sin^{-1}(1/n)$, wherein n is a refractive index of said light guide member;

wherein flat portions constituting a part of the top face of said light guide member are arranged in between adjacent ones of said plurality of the grooves; and wherein the object is disposed on a side of the bottom face of said light guide member and is observable from the top face side of said light guide member.

2. An illuminating system as claimed in claim 1, wherein a pitch of said plurality of grooves provided on the top face of said light guide member is not more than a dot pitch of the object.

3. An illuminating system as claimed in claim 1, wherein a length of the first slope of each of the V-shaped grooves on said light guide member is not more than, where L is a distance between the top face of said light guide member and an observation point for observing the object.

4. An illuminating system as claimed in claim 1, wherein said light guide member is a transparent plate which is made from either quartz, glass, transparent resin, or polycarbonate.

5. An illuminating system as claimed in claim 1, where said light guide member is approximately wedged shaped and wherein a side face of said light guide member which is closest to said light source has a thickness at least equal to a thickness of another side face of said light guide member.

6. An illuminating system as claimed in claim 1, wherein said illuminating system further comprises a reflector disposed so as to cover said light source, said reflector having an inner surface having a high reflectivity so as to reflect light which is emitted from said light source and direct such reflected light into said light guide member.

7. An illuminating system as claimed in claim 6, wherein a height of said reflector and a thickness of a side face of said light guide member which is closest to said light source are equal to each other.

\* \* \* \* \*